(12) United States Patent
Padaki et al.

(10) Patent No.: US 8,788,549 B2
(45) Date of Patent: Jul. 22, 2014

(54) ZERO OVERHEAD BLOCK FLOATING POINT IMPLEMENTATION IN CPU'S

(75) Inventors: Gururaj Padaki, Karnataka (IN); Anindya Saha, Karnataka (IN); Parag Naik, Karnataka (IN); Vishwakumara Kayargadde, Karnataka (IN); Sunil Hr, Karnataka (IN)

(73) Assignee: Saankhya Labs Private Limited, Bangalore (IN)

( * ) Notice: Subject to any disclaimer, the term of this patent is extended or adjusted under 35 U.S.C. 154(b) by 311 days.

(21) Appl. No.: 13/461,902

(22) Filed: May 2, 2012

(65) Prior Publication Data

US 2012/0284464 A1 Nov. 8, 2012

(30) Foreign Application Priority Data

May 2, 2011 (IN) .............................. 1510/CHE/2011

(51) Int. Cl.
*G06F 7/00* (2006.01)
*G06F 7/38* (2006.01)
*G06F 7/483* (2006.01)

(52) U.S. Cl.
CPC ..................................... *G06F 7/483* (2013.01)
USPC .......................................... 708/208; 708/498

(58) Field of Classification Search
CPC ..... H03H 17/0054; G06F 7/572; G06F 7/483; G06F 7/5443; G06F 7/49905; H03G 3/002; H03M 7/50; H04B 14/048
USPC ................................................... 708/208, 498
See application file for complete search history.

(56) References Cited

U.S. PATENT DOCUMENTS

| | | | |
|---|---|---|---|
| 5,121,003 A | 6/1992 | Williams | |
| 5,241,490 A * | 8/1993 | Poon | 708/205 |
| 6,131,104 A | 10/2000 | Oberman | |
| 6,947,962 B2 * | 9/2005 | Hoskote | 708/498 |
| 7,437,540 B2 | 10/2008 | Paolucci et al. | |
| 7,669,041 B2 | 2/2010 | Khailany et al. | |
| 8,280,939 B2 * | 10/2012 | Reyzin et al. | 708/498 |
| 8,631,056 B2 * | 1/2014 | Krithivasan et al. | 708/205 |

* cited by examiner

*Primary Examiner* — Tan V. Mai
(74) *Attorney, Agent, or Firm* — The Law Office of Austin Bonderer, PC; Austin Bonderer

(57) ABSTRACT

A system for computing a block floating point scaling factor by detecting a dynamic range of an input signal in a central processing unit without additional overhead cycles is provided. The system includes a dynamic range monitoring unit that detects the dynamic range of the input signal by snooping outgoing write data and incoming memory read data of the input signal. The dynamic range monitoring unit includes a running maximum count unit that stores a least value of a count of leading zeros and leading ones, and a running minimum count that stores a least value of the count of trailing zeros. The dynamic range is detected based on the least value of the count of leading zeros and leading ones and the count of trailing zeros. The system further includes a scaling factor computation module that computes the block floating point (BFP) scaling factor based on the dynamic range.

15 Claims, 19 Drawing Sheets

| S | b0 | b1 | b2 | ...... | b(k-1) | b(k) | b(k+1) | ...... | b(j-6) | b(j-5) | b(j-4) | b(j-3) | b(j-2) | b(j-1) |

| S | S | S | S | S | S | b(k) | b(k+1) | ...... | b(j-6) | b(j-5) | b(j-4) | b(j-3) | b(j-2) | b(j-1) |

K- POSITIONS

| INPUT ASSUMED | PRE-SCALE FACTOR | OUTPUT OF PRE-SCALE OPERATION = INPUT ASSUMED X (2^(+ PRE_SCALE_FACTOR)) |
|---|---|---|
| s.d0-d1-d2-d3-d4-d5-d6-d7-d8-d9-d10-d11-d12-d13-d14 | -1 | s.s-d0-d1-d2-d3-d4-d5-d6-d7-d8-d9-d10-d11-d12-d13 |
| s.d0-d1-d2-d3-d4-d5-d6-d7-d8-d9-d10-d11-d12-d13-d14 | 0 | s.d0-d1-d2-d3-d4-d5-d6-d7-d8-d9-d10-d11-d12-d13-d14 |
| s.s-d1-d2-d3-d4-d5-d6-d7-d8-d9-d10-d11-d12-d13-d14 | 1 | s.d1-d2-d3-d4-d5-d6-d7-d8-d9-d10-d11-d12-d13-d14-'0' |
| s.s-s-d2-d3-d4-d5-d6-d7-d8-d9-d10-d11-d12-d13-d14 | 2 | s.d2-d3-d4-d5-d6-d7-d8-d9-d10-d11-d12-d13-d14-'00' |
| s.s-s-s-d3-d4-d5-d6-d7-d8-d9-d10-d11-d12-d13-d14 | 3 | s.d3-d4-d5-d6-d7-d8-d9-d10-d11-d12-d13-d14-'000' |
| s.s-s-s-s-d4-d5-d6-d7-d8-d9-d10-d11-d12-d13-d14 | 4 | s.d4-d5-d6-d7-d8-d9-d10-d11-d12-d13-d14-'0000' |
| s.s-s-s-s-s-d5-d6-d7-d8-d9-d10-d11-d12-d13-d14 | 5 | s.d5-d6-d7-d8-d9-d10-d11-d12-d13-d14-'0_0000' |
| s.s-s-s-s-s-s-d6-d7-d8-d9-d10-d11-d12-d13-d14 | 6 | s.d6-d7-d8-d9-d10-d11-d12-d13-d14-'00_0000' |
| s.s-s-s-s-s-s-s-d7-d8-d9-d10-d11-d12-d13-d14 | 7 | s.d7-d8-d9-d10-d11-d12-d13-d14-'000_0000' |
| s.s-s-s-s-s-s-s-s-d8-d9-d10-d11-d12-d13-d14 | 8 | s.d8-d9-d10-d11-d12-d13-d14-'0000_0000' |
| s.s-s-s-s-s-s-s-s-s-d9-d10-d11-d12-d13-d14 | 9 | s.d9-d10-d11-d12-d13-d14-'0000_0000_0' |
| s.s-s-s-s-s-s-s-s-s-s-d10-d11-d12-d13-d14 | 10 | s.d10-d11-d12-d13-d14-'0000_0000_00' |
| s.s-s-s-s-s-s-s-s-s-s-s-d11-d12-d13-d14 | 11 | s.d11-d12-d13-d14-'0000_0000_000' |
| s.s-s-s-s-s-s-s-s-s-s-s-s-d12-d13-d14 | 12 | s.d12-d13-d14-'0000_0000_0000' |
| s.s-s-s-s-s-s-s-s-s-s-s-s-s-d13-d14 | 13 | s.d13-d14-'0000_0000_0000_0' |
| s.s-s-s-s-s-s-s-s-s-s-s-s-s-s-d14 | 14 | s.d14-'0000_0000_0000_00' |
| s.s-s-s-s-s-s-s-s-s-s-s-s-s-s-s | 15 | s.'0000_0000_0000_000' |

FIG. 7

| INPUT ASSUMED | POST-SCALE FACTOR | OUTPUT OF POST-SCALE OPERATION = INPUT ASSUMED (IN LAST 31 BITS) X (2 ^ ( POSTSCALE_FACTOR)) |
|---|---|---|
| s_s_.d0-d1-d2-d3-d4-d5-d6-d7-...-d13-d14-d15-...d24-d25-d26-d27-d28-d29 | -16 | s_s_.s-s-s-s-s-s-s-s-s-s-s-s-s-s-s-...-s*[-s-d0-d1-d2-...-d11-d12-d13-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | -15 | s_s_.s-s-s-s-s-s-s-s-s-s-s-s-s-s-s-...-s*[-d0-d1-d2-...-d11-d12-d13-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | -14 | s_s_.s-s-s-s-s-s-s-s-s-s-s-s-s-s-s-...-s-d0*[d1-d2-...-d11-d12-d13-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | ...... | ............ |
| s_s_.d0-d1-d2-d3-d4-d5-d6-d7-...-d13-d14-d15-...d24-d25-d26-d27-d28-d29 | -6 | s_s_.s-s-s-s-s-d0-d1-d2-d3-d4-d5-d6-d7-...-d8*[-d9-d10-d11-d12-d13-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | -5 | s_s_.s-s-s-s-d0-d1-d2-d3-d4-d5-d6-d7-...-d9*[-d10-d11-d12-d13-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | -4 | s_s_.s-s-s-d0-d1-d2-d3-d4-d5-d6-d7-...-d10-*[d11-d12-d13-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | -3 | s_s_.s-s-d0-d1-d2-d3-d4-d5-d6-d7-...-d11*[-d12-d13-d14-d15-...d24-d25-d26-d27-d28-d29]* |

FIG. 8A

| INPUT ASSUMED | POST-SCALE FACTOR | OUTPUT OF POST-SCALE OPERATION = INPUT ASSUMED (IN LAST 31 BITS) X (2 ^ ( POSTSCALE_FACTOR)) |
|---|---|---|
| s_s_.d0-d1-d2-d3-d4-d5-d6-d7-...-d13-d14-d15-...d24-d25-d26-d27-d28-d29 | -2 | s_s_.s_-d0-d1-d2-d3-d4-d5-d6-d7-...-d12*[-d13-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | -1 (No scaling) | s_s_.d0-d1-d2-d3-d4-d5-d6-d7-...-d13*[-d14-d15-...d24-d25-d26-d27-d28-d29]* |
| s_s_.d0-d1-d2-d3-d4-d5-d6-d7-...-d13-d14-d15-...d24-d25-d26-d27-d28-d29 | 0 | s_.d0-d1-d2-d3-d4-d5-d6-d7-...-d13-d14*[-d15-...d24-d25-d26-d27-d28-d29-'0']* |
| s_s_.s-d1-d2-d3-d4-d5-d6-d7-...-d13-d14-d15-...d24-d25-d26-d27-d28-d29; [d0=s] | 1 | s_.d1-d2-d3-d4-d5-d6-d7-...-d13-d14-d15-d16...d24-d25-d26-d27-d28-d29-'00'] |
| s_s_.s-s-d2-d3-d4-d5-d6-d7-...-d13-d14-d15-...d24-d25-d26-d27-d28-d29; [d0,d1=s] | 2 | s_.d2-d3-d4-d5-d6-d7-...-d13-d14-d15-d16-[d17...d24-d25-d26-d27-d28-d29-'000'] |
| s_s_.s-s-s-d3-d4-d5-d6-d7-...-d13-d14-d15-...d24-d25-d26-d27-d28-d29; [d0,d1,d2=s] | 3 | s_.d3-d4-d5-d6-d7-...-d13-d14-d15-d16-d17*[-d18...d24-d25-d26-d27-d28-d29-'0000']* |
| s_s_.s-s-s-s-d4-d5-d6-d7-...-d13-d14-d15-...d24-d25-d26-d27-d28-d29; [d0,d1,d2,d3=s] | 4 | s_.d4-d5-d6-d7-...-d13-d14-d15-d16-d17-d18*[-d19...d24-d25-d26-d27-d28-d29-'0000'-'0']* |
| ......... | ..... | ..... |
| s_s_.s-s-s-s-s-s-...-s-s-d15-...d24-d25-d26-d27-d28-d29; [d0,d1,....d,13,d14=s] | 15 | s_.d15-d16-d17-d18-...-d24-d25-d26-d27-d28-d29*[-'0000'-'0000'....]* |

FIG. 8B

| INPUT ASSUMED | POST-SCALE FACTOR | OUTPUT OF POST-SCALE OPERATION = INPUT ASSUMED (IN LAST 31 BITS) X (2 ^ ( POSTSCALE_FACTOR)) |
|---|---|---|
| s_l_.d0-d1-d2-d3-d4-d5-d6-d7...d13-d14-d15-...d24-d25-d26-d27-d28-d29 | −16 | s_s_.s-s-s-s-s-s-s-s-s-s-s...s[-l-d0-d1-d2-...d11-d12-d13-d14-d15-...d24-d25-d26-d27-d28-d29] |
| s_l_.d0-d1-d2-d3-d4-d5-d6-d7...d13-d14-d15-...d24-d25-d26-d27-d28-d29 | −15 | s_s_.s-s-s-s-s-s-s-s-s-s-s...[-d0-d1-d2-...d11-d12-d13-d14-d15-...d24-d25-d26-d27-d28-d29] |
| s_l_.d0-d1-d2-d3-d4-d5-d6-d7...d13-d14-d15-...d24-d25-d26-d27-d28-d29 | −14 | s_s_.s-s-s-s-s-s-s-s-s-s-s...-l-d0[d1-d2-...d11-d12-d13-d14-d15-...d24-d25-d26-d27-d28-d29] |
| s_l_.d0-d1-d2-d3-d4-d5-d6-d7...d13-d14-d15-...d24-d25-d26-d27-d28-d29 | ...... | ............ |
| s_l_.d0-d1-d2-d3-d4-d5-d6-d7...d13-d14-d15-...d24-d25-d26-d27-d28-d29 | −6 | s_s_.s-s-s-l-d0-d1-d2-d3-d4-d5-d6-d7...-d8[-d9-d10-d11-d12-d13-...d24-d25-d26-d27-d28-d29] |
| s_l_.d0-d1-d2-d3-d4-d5-d6-d7...d13-d14-d15-...d24-d25-d26-d27-d28-d29 | −5 | s_s_.s-s-s-l-d0-d1-d2-d3-d4-d5-d6-d7...-d9[-d10-d11-d12-d13-d14-d15-...d24-d25-d26-d27-d28-d29] |
| s_l_.d0-d1-d2-d3-d4-d5-d6-d7...d13-d14-d15-...d24-d25-d26-d27-d28-d29 | −4 | s_s_.s-s-l-d0-d1-d2-d3-d4-d5-d6-d7...-d10-[d11-d12-d13-d14-d15-...d24-d25-d26-d27-d28-d29] |
| s_l_.d0-d1-d2-d3-d4-d5-d6-d7...d13-d14-d15-...d24-d25-d26-d27-d28-d29 | −3 | s_s_.s-l-d0-d1-d2-d3-d4-d5-d6-d7...d11[-d12-d13-d14-d15-...d24-d25-d26-d27-d28-d29] |

FIG. 9A

| INPUT ASSUMED (902) | POST-SCALE FACTOR (904) | OUTPUT OF POST-SCALE OPERATION = INPUT ASSUMED (IN LAST 31 BITS) X (2^(POSTSCALE_FACTOR)) (906) |
|---|---|---|
| s_l_.d0-d1-d2-d3-d4-d5-d6-d7-...-d13-d14-d15-...d24-d25-d26-d27-d28-d29 | -2 | s_s_.l-d0-d1-d2-d3-d4-d5-d6-d7-...-d12[-d13-d14-d15-...d24-d25-d26-d27-d28-d29] |
| s_l_.d0-d1-d2-d3-d4-d5-d6-d7-...-d13-d14-d15-...d24-d25-d26-d27-d28-d29 | -1 (No scaling) | s_l_.d0-d1-d2-d3-d4-d5-d6-d7-...-d13 [-d14-d15-...d24-d25-d26-d27-d28-d29] |
| s_l_.d0-d1-d2-d3-d4-d5-d6-d7-...-d13-d14-d15-...d24-d25-d26-d27-d28-d29; [l=s] | 0 | s_.d0-d1-d2-d3-d4-d5-d6-d7-...-d13-d14[-d15-...d24-d25-d26-d27-d28-d29-'0'] |
| s_s_.d0-d1-d2-d3-d4-d5-d6-d7-...-d13-d14-d15-...d24-d25-d26-d27-d28-d29; [l=s] | 1 | s_.d0-d1-d2-d3-d4-d5-d6-d7-...-d13-d14-d15[-d16...d24-d25-d26-d27-d28-d29-'00'] |
| s_s_.s.d0-d1-d2-d3-d4-d5-d6-d7-...-d13-d14-d15-...d24-d25-d26-d27-d28-d29; [l,d0=s] | 2 | s_.d1-d2-d3-d4-d5-d6-d7-...-d13-d14-d15-d16-[d17...d24-d25-d26-d27-d28-d29-'000'] |
| s_s_.s-s-d3-d4-d5-d6-d7-...-d13-d14-d15-...d24-d25-d26-d27-d28-d29; [l,d0,d1=s] | 3 | s_.d2-d3-d4-d5-d6-d7-...-d13-d14-d15-d16-d17[-d18...d24-d25-d26-d27-d28-d29-'0000'] |
| s_s_.s-s-s-d4-d5-d6-d7-...-d13-d14-d15-...d24-d25-d26-d27-d28-d29; [l,d0,d1,d2=s] | 4 | s_.d3-d4-d5-d6-d7-...-d13-d14-d15-d16-d17-d18[-d19...d24-d25-d26-d27-d28-d29-'0000'-'0'] |
| ....... | ..... | ....... |
| s_s_.s-s-s-s-s-s-...-s-s-d15-...d24-d25-d26-d27-d28-d29; [l,d0,d1,...,d13=s] | 15 | s_.d15-d16-d17-d18-...d24-d25-d26-d27-d28-d29['0000'-'0000'....] |

FIG. 9B

ZERO OVERHEAD BLOCK FLOATING POINT IMPLEMENTATION IN CPU'S

BACKGROUND

1. Technical Field

The embodiments herein generally relate to dynamic range detection, and, more particularly, to dynamic range detection in CPUs in receivers.

2. Description of the Related Art

Typically central processing unit (CPU) architectures in digital signal processors do not support efficient implementation of block floating point processing on arrays. Even in architectures, where block floating is supported, a lot of control code needs to be added to take care of pre and post scaling of data blocks based on a dynamic range of signals at each stage. The problem with these existing methods is that the overheads in the control code for detecting the dynamic range of signals could be significant to the extent that it may run out of the available MIPS or cycles for a given application.

In addition it needs to support arithmetic data-path widths that are higher than the optimal. This potentially leads to bigger designs, consequently increasing area and leading to more than necessary power dissipation. Both fixed and floating-point implementations have their respective advantages. It is possible to achieve the dynamic range approaching that of floating-point arithmetic while working with fixed-point processors. This can be accomplished by using floating-point emulation software routines.

Fixed point representation is a real data type for a number that has a fixed number of digits after the radix point. Floating point describes a system for representing real numbers which supports a wide range of values. Numbers are in general represented approximately to a fixed number of significant digits and scaled using an exponent. In fixed point processors it is possible to achieve the dynamic range of signals similar to that achieved in floating-point processors by using floating-point emulation software routines. Emulating floating-point behavior on a fixed-point processor is very cycle intensive, since the emulation routine manipulates all arithmetic computations to artificially implement floating-point math on a fixed-point device. This software emulation is only worthwhile if a small portion of the overall computation requires extended dynamic range. Hence, a cost-effective alternative for floating-point dynamic range implemented on a fixed-point processor is needed. This is where block floating point algorithm plays a significant role.

The block floating point algorithm is based on the block automatic gain control (AGC) concept. The AGC scales values at the input stage of a signal processing function and only adjusts the input signal power. The block floating point algorithm takes it a step further by tracking the signal strength from stage to stage to provide a more comprehensive scaling strategy and extended dynamic range. The floating-point emulation scheme discussed here is the block floating-point algorithm. The primary benefit of the block floating-point algorithm emanates from the fact that operations are carried out on a block basis using a common exponent. Here, each value in the block can be expressed in two components namely a mantissa and a common exponent. The common exponent is stored as a separate data word. This leads to a minimum hardware implementation compared to that of a conventional floating-point implementation.

The value of the common exponent is determined by the data element in the block with the largest amplitude. In order to compute the value of the exponent, the number of leading zeros or leading ones bits has to be determined. This is determined by the number of left shifts required for this data element to be normalized to the dynamic range of the processor. If a given block of data of the input signal consists entirely of small values, a large common exponent can be used to shift the small data values left and provide more dynamic range. On the other hand, if a data block contains large data values, then a small common exponent will be applied. Once the common exponent is computed, all data elements in the block are shifted up by that amount, in order to make optimal use of the available dynamic range. Scaling each value up by the common exponent increases the dynamic range of data elements in comparison to that of a fixed-point implementation.

In communication based applications an analog to digital converter (ADC) is used for sampling the input signals. The ADC specifications like Effective number of Bits (ENOB) etc are usually chosen on the basis of worst case channel conditions which is why these have sufficient Headroom beyond the required SNR requirements. This is shown in FIG. 1. FIG. 1 is a typical block diagram illustrating how worst case dynamic range is considered for ADC selection. However in an actual application these worst case conditions will not occur at all times. This will result in a variable and lesser than the maximum required dynamic range of the incoming sampled signals on an average while processing such samples for any signal processing function (like filtering, FFT etc). In a typical DSP CPU these sampled signals will be read for any signal processing operation and at the end of the signal processing tasks these will be written to a Data memory. Because of the varying nature of dynamic range of the incoming signal which is read, the output data from a signal processing is also likely to have some variation of dynamic range. This is why block floating point implementation of signal processing functions is useful so that it consumes lesser power, without sacrificing area.

There are some hardwired architectures for doing block floating point implementations for FFT computations. Since, they are hardwired blocks there is no overhead due in SW cycles consumption, though they would consume finite cycles. In addition, since these address only one class of signal processing functions like FFT, they cannot be reused for other classes.

SUMMARY

In view of the foregoing, an embodiment herein provides a system for computing a block floating point (BFP) scaling factor by detecting a dynamic range of an input signal in a central processing unit (CPU) without additional overhead cycles. The system includes a dynamic range monitoring unit that detects the dynamic range of the input signal by snooping (i) outgoing write data and (ii) incoming memory read data of the input signal. The dynamic range monitoring unit includes a leading zero and leading one detector and counter unit that detects a count of leading zeros and leading ones for each sub-word of the outgoing write data and the incoming memory read data of the input signal, a registered maximum count unit that stores the count of leading zeros and leading ones for each sub word of the outgoing write data and the incoming memory read data of the input signal, a least value finder unit that determines a least value of the count of the leading zeros and leading ones over a block of data, and a running maximum count unit that stores the least value of the count of the leading zeros and leading ones over the block of data. The dynamic range is detected based on the least value of the count of the leading zeros and leading ones over the block of data and a least value of a count of trailing zeros over the block of data. The system further includes a scaling factor computation module that computes a block floating point (BFP) scaling factor based on the dynamic range.

The dynamic range monitoring unit further includes a bus swapper unit that bus-swaps each of the sub-word of the outgoing write data and the incoming memory read data of the input signal such that (i) a most significant bit (MSB) position of each of the sub word occupies a least significant bit (LSB) position, and (ii) a LSB position of each of the sub-word occupies a MSB position, a trailing zeros detector and counter unit that detects a count of trailing zeros over the block of data for each of the sub-word of the outgoing write data and the incoming memory read data of the input signal, a registered minimum count unit that stores the count of trailing zeros for each of the sub-word of the outgoing write data and the incoming memory read data, a least value finder unit that determines the least value of the count of trailing zeros over the block of data, and a running minimum count unit that stores the least value of the count of trailing zeros over the block of data.

The count of leading zeros and leading ones, the least value of the counted leading zeros and leading ones, the count of trailing zeros, and the least value of the count of trailing zeros may be preset to a highest possible value before detecting the dynamic range at a start of the load and store operations. The system may further include a CPU control register (CCR) that turns on and turns off the dynamic range using a specified program. The dynamic range may be updated in a control register file at an end of a signal processing operation when a value of control bit signals is cleared to zero. The signal processing operation is at least one of a load operation, a store operation, an arithmetic operation, and a logical function operation. The dynamic range is detected in at least one of a load store unit, an arithmetic unit, and a logical function unit.

In another aspect, a method for implementing a block floating point (BFP) scaling factor by detecting a dynamic range of an input signal in a central processing unit (CPU) without additional overhead cycles is provided. The method includes detecting a count of leading zeros and leading ones for each sub-word of the outgoing write data and the incoming memory read data of the input signal using a leading zero and leading one detector and counter unit, storing the count of leading zeros and leading ones for each sub-word of the outgoing write data and the incoming memory read data of the input signal using a registered maximum count unit, determining a least value of the count of the leading zeros and leading ones over a block of data using a least value finder unit, storing the least value of the count of the leading zeros and leading ones over the block of data using a running maximum count unit, detecting the dynamic range based on (i) the least value of the count of the leading zeros and leading ones over the block of data and (ii) a least value of a count of trailing zeros over the block of data by a dynamic range monitoring unit, and computing the block floating point (BFP) scaling factor based on the dynamic range.

The method further includes determining whether a signal processing stage is a first stage, the BFP scaling factor is obtained from a previous stage when the signal processing stage is not the first stage, and computing a new BFP scaling factor for a second stage based on the dynamic range, the input data for the second stage is shifted using the new BFP scaling factor along with a first signal processing operation, an output of the first stage is shifted and written on a memory addressed by the CPU using the new BFP scaling factor along with a second signal processing operation.

The new BFP scaling factor may be set to zero when the signal processing stage is the first stage. It may be determined whether the second stage is a last signal processing stage. Arithmetic scaling and residue scaling components of the new BFP scaling factor for the second stage may be determined. A residue exponent may be computed by scaling the residue scaling components of the first stage till until the last signal processing stage to obtain a required native precision of the input signal. Dummy load operations may be performed on two data sets of the input signal. A dynamic range of two data sets may be detected. A scaling factor is computed based on the dynamic range of the two data sets of the input signal. The first signal processing operation and the second signal processing operation is at least one of a load operation, a store operation, an arithmetic operation, and a logical function operation.

The method further includes bus-swapping using a bus swapper unit, each sub-word of the outgoing write data and the incoming memory read data of the input signal such that (i) a most significant bit (MSB) position of the each sub-word occupies a least significant bit (LSB) position, and (ii) a LSB position of the each sub-word occupies a MSB position, detecting the count of trailing zeros for the each sub-word of the outgoing write data and the incoming memory read data of the input signal using a trailing zeros detector and counter unit, storing the count of trailing zeros for the each sub-word of the outgoing write data and the incoming memory read data using a registered minimum count unit, determining a least value of the count of trailing zeros over the block of data using a least value finder unit, and storing the least value of the count of trailing zeros over the block of data using a running minimum count unit.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3D illustrate an input block data of a Q.J digit fixed point number with one sign bit to the dynamic range monitor block of FIG. 3A according to an embodiment herein;

FIG. 3E illustrate the input block data of the Q.J digit fixed point number with one sign bit to the dynamic range monitor block of FIG. 3A when the sign bit is same as a first "K" fractional bits according to an embodiment herein;

FIG. 7 is a table view illustrating pre-scaling of source operand according to an embodiment herein;

FIGS. 8A and 8B are table views illustrating post scaling with real multiplies operation according to an embodiment herein;

FIG. 9A and FIG. 9B are table views illustrating post scaling with complex multiply table according to an embodiment herein;

DETAILED DESCRIPTION

Figure 1:
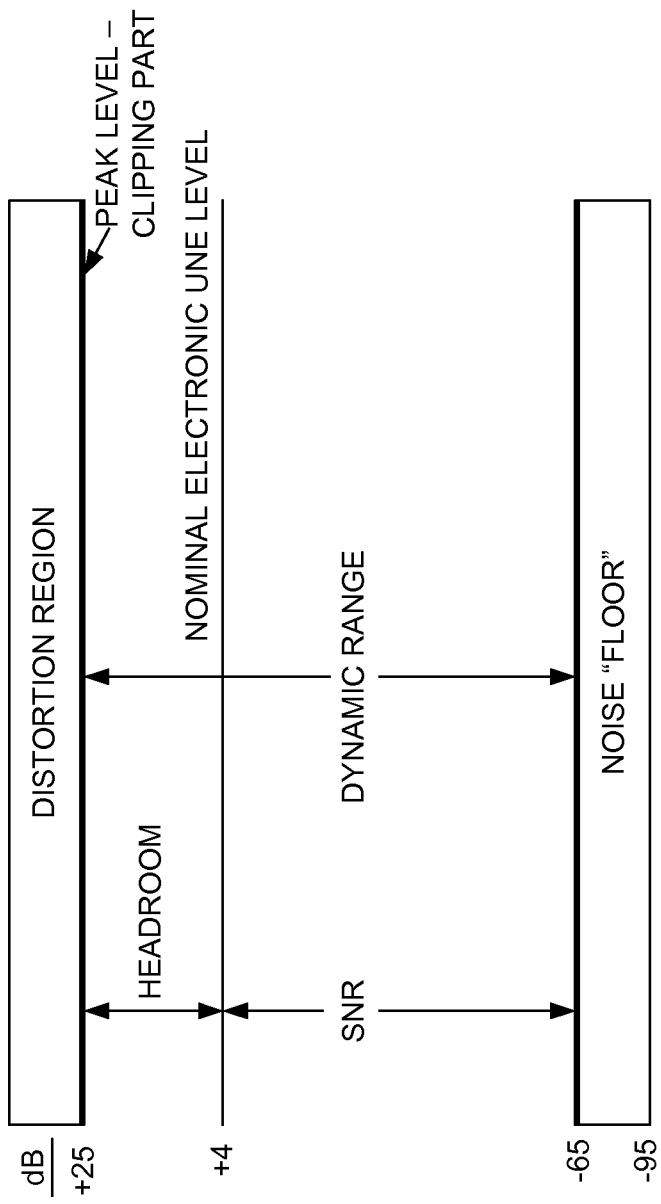
FIG. 1 is a typical block diagram illustrating worst case dynamic range consideration for an ADC.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for different types of digital signal processors (e.g., CPUs) like very long instruction word (VLIW) processors or superscalar or single-issue processors for Software defined radio subsystem or for receivers. The embodiments herein achieve this by providing a method by which dynamic range of input signal (for different classes) is detected with zero overhead using dynamic range detection with load store operations in VLIW processors. The scheme is generic and can be extended to any type of CPU architecture like single-issue or superscalar processors. Referring now to the drawings, and more particularly to FIGS. 2 through 13, where similar reference characters denote corresponding features consistently throughout the figures, preferred embodiments are described herein.

Figure 2:
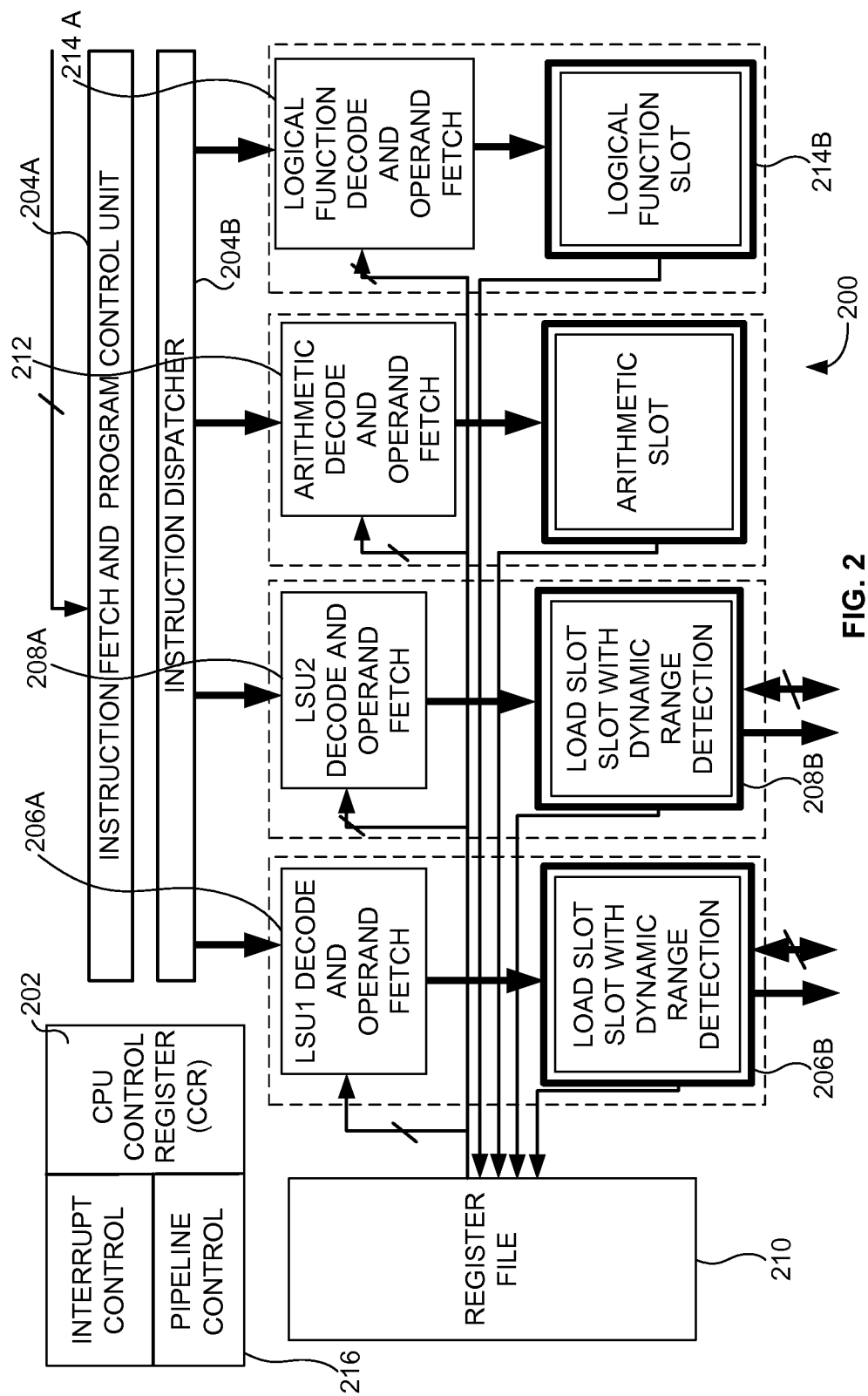
FIG. 2 illustrates a block diagram of a central processing unit (CPU) for detecting a dynamic range of an input signal according to an embodiment herein.

FIG. 2 illustrates a block diagram of a central processing unit (CPU) 200 for detecting a dynamic range of an input signal according to an embodiment herein. In one embodiment, the CPU 200 is a Very Large Instruction Word (VLIW) CPU (e.g., a digital signal processor (DSP)) used as an example here but the scheme can be used for any CPU architecture with a capability to do Load-Store operations from the memory. The CPU 200 includes a CPU control register (CCR) 202, an instruction fetch & program control unit 204A, an instruction dispatcher 204B, a load store unit1 (LSU1) decode and operand fetch 206A, a load-store slot with dynamic range detection for load store unit1 206B, a load store unit2 (LSU2) decode and operand fetch 108A, a load-store slot with dynamic range detection for load store unit2 208B for a memory store or load operation.

In a generic case, the CPU is likely to have one or more Load-Store units. The instruction is first decoded after the dispatch phase and then executed. In addition, the VLIW CPU 200 consists of a register file 210, an arithmetic slot 212, a logical function decode and operand fetch slot 214A, a logical function slot 214B, and a pipeline and interrupt control unit 216. The contents to be written to the memory are fetched from the register file 210 and along with the decoded bits and are latched in an operand fetch phase.

The arithmetic slot 212 processes real or complex signals, along with miscellaneous execution units like logic function slot 214B etc. The CPU control register (CCR) 202 turns on or turns off the dynamic range monitoring function as desired by a programmer for load or store operations from the memory. In one embodiment, the CPU control register (CCR) 202 turns on and turns off the dynamic range using a specified program (as desired by a programmer) for the load or store operations. The load store unit1 (LSU1) decode and operand fetch 206A and 208A perform load and store operations in a DSP processor (e.g., the CPU 200) for detecting the dynamic range of the input signal.

Figure 3A:
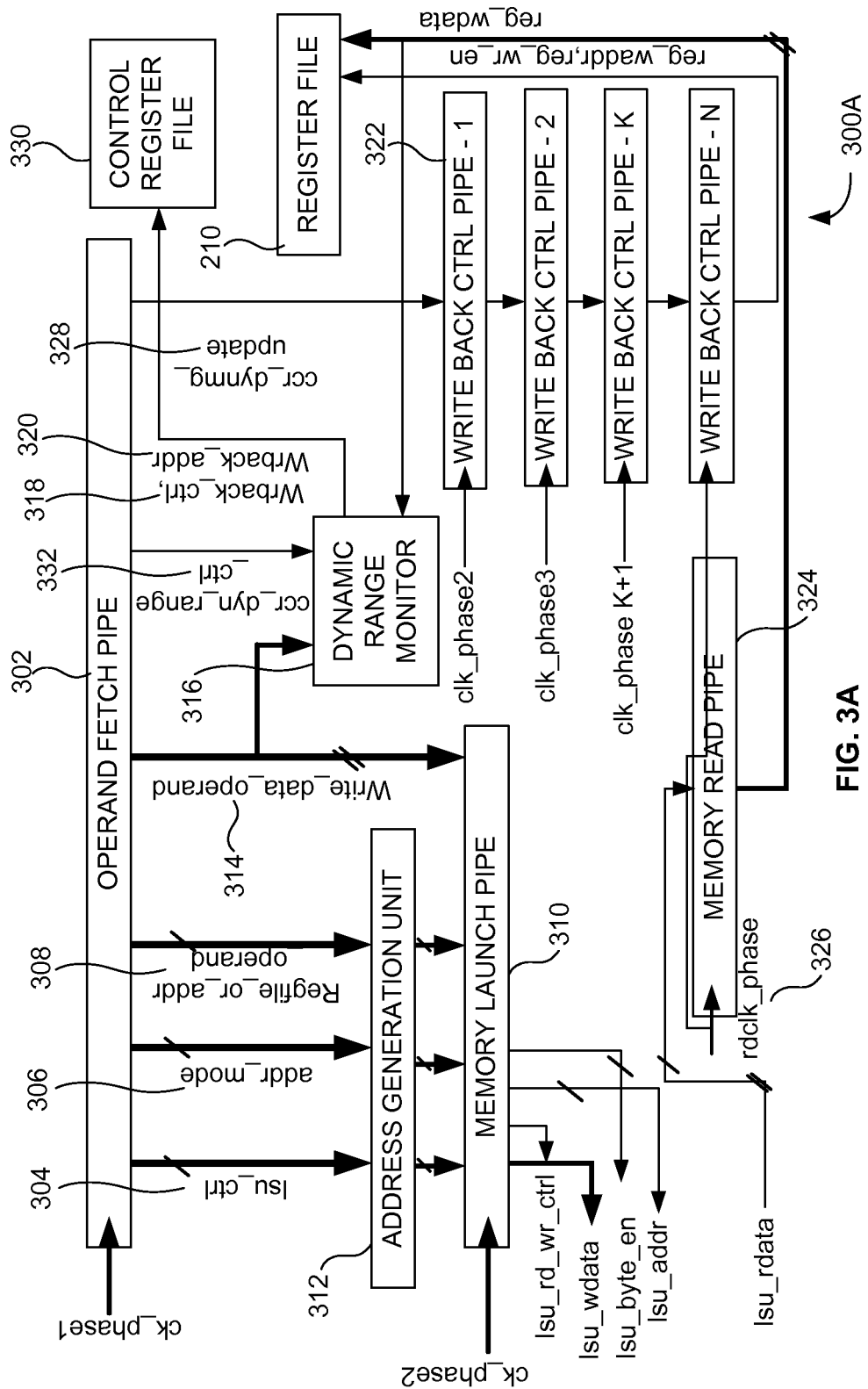
FIG. 3A illustrates an exploded view of the load-store slot with dynamic range detection for Load Store Unit1 and Load Store Unit2 of FIG. 2 for a memory store or load operation and dynamic range monitoring according to an embodiment herein.

FIG. 3A illustrates an exploded view of the load-store slot with dynamic range detection for unit1 and unit2 206B-208B of FIG. 2 for a memory store or load operation and dynamic range monitoring according to an embodiment herein. The load-store unit with dynamic range monitoring includes writeback paths to the register file 210, and various signals coming from a previous pipeline stage namely: an operand fetch pipe 302, the signals being load store unit control 304 that signifies the type of memory operation (read or write), an address mode 306, and an address operand 308.

The load-store unit with dynamic range monitoring 300A further includes a memory launch pipe 310 which receives data from an address generation unit 312, and a write data operand signal 314 from the operand fetch pipe 302. The address mode 306 signifies the various types of addressing modes. The address operand 308 signifies the address of the memory operation. The address generation unit 312 generates an address based on an addressing mode of the input signal.

The load-store unit with dynamic range monitoring 300A further includes a dynamic range monitor block 316 that snoops on the write data operand 314 received from the operand fetch pipe 302. In one embodiment, the dynamic range monitor block 316 detects the dynamic range of the input signal by snooping (i) an outgoing write data and (ii) an incoming memory read data of the input signal.

The write back control 318 and the write back address 320 are latched in the write back control pipe 322 for a required number of load-delay cycles for eventually writing back to the register file 210. The memory read pipe 324 receives data from the memory which is clocked using a rdclk_phase signal 326. In one embodiment, an incoming memory read data is latched in a memory read pipe 324 and clocked using a memory read clock (e.g., the rdclk_phase 326). Similarly, the outgoing write data is obtained from the control register file 330 and written on a memory.

In one embodiment, a similar snooping operation is also performed on the register write data bus when the loaded data from the memory read pipe 324 is being written back into the register file 210. The outgoing write data and one or more decoded bits are latched in the operand fetch pipe 302. The outgoing write data and the incoming memory read data are enabled using control bit signals that are generated from the operand fetch pipe 302 (e.g., an operand fetch phase) and are set at a start of the load and store operations (e.g., load or store cycles) which needs to be monitored. The dynamic range monitor block 316 snoops the outgoing write data and incoming memory read data and is enabled using the control bit CPU control register dynamic range control 332.

The signal "cpu control dynamic range update" 328 is used to update the value of dynamic range detected in the CPU control register file 330. In one embodiment, the dynamic range is updated in the control register file 330 at an end of signal processing operations when a value of control bit signals is cleared to zero. In one embodiment, the signal processing operation is at least one of a load operation, a store operation, an arithmetic operation, and/or a logical function operation. A maximum exponent value is computed and latched into the CCR 202 when the control bit signals is cleared to zero. The dynamic range monitoring is turned on using the signal CPU control register dynamic range control 332 (e.g., ccr_dyn_range_ctrl).

The load store unit control signal 304, the address mode signal 306, the address operand signal 308 generate the appropriate address based on the addressing mode (e.g.,a linear addressing mode, a circular addressing mode, a bit reverse addressing mode, and an indirect addressing mode) in the next phase. These signals are launched to the memory interface from the memory launch pipe 310. The data block to be written to the memory, consists of the signal named write data operand 314 (e.g., the write_data_operand 214) which is snooped to determine the dynamic range of a given block.

The signals the write back control 318 and the write back address 320 are preserved throughout the load delay cycles in the intermediate pipeline stages namely write back control pipe-1 322, write back control pipe-2. etc., upto write back control pipe-N. The active to inactive transition of the CPU control register dynamic range control bit signals of the dynamic range monitoring 316 can be turned off and the previous value of dynamic range calculated can be latched. In this manner, the load-store unit stores the dynamic range for a block of data of the input signal without adding overhead cycles. Similarly, the dynamic range can be detected in other units (e.g., an arithmetic unit, and/or a logical function unit as shown in FIG. 2).

Figure 3B:
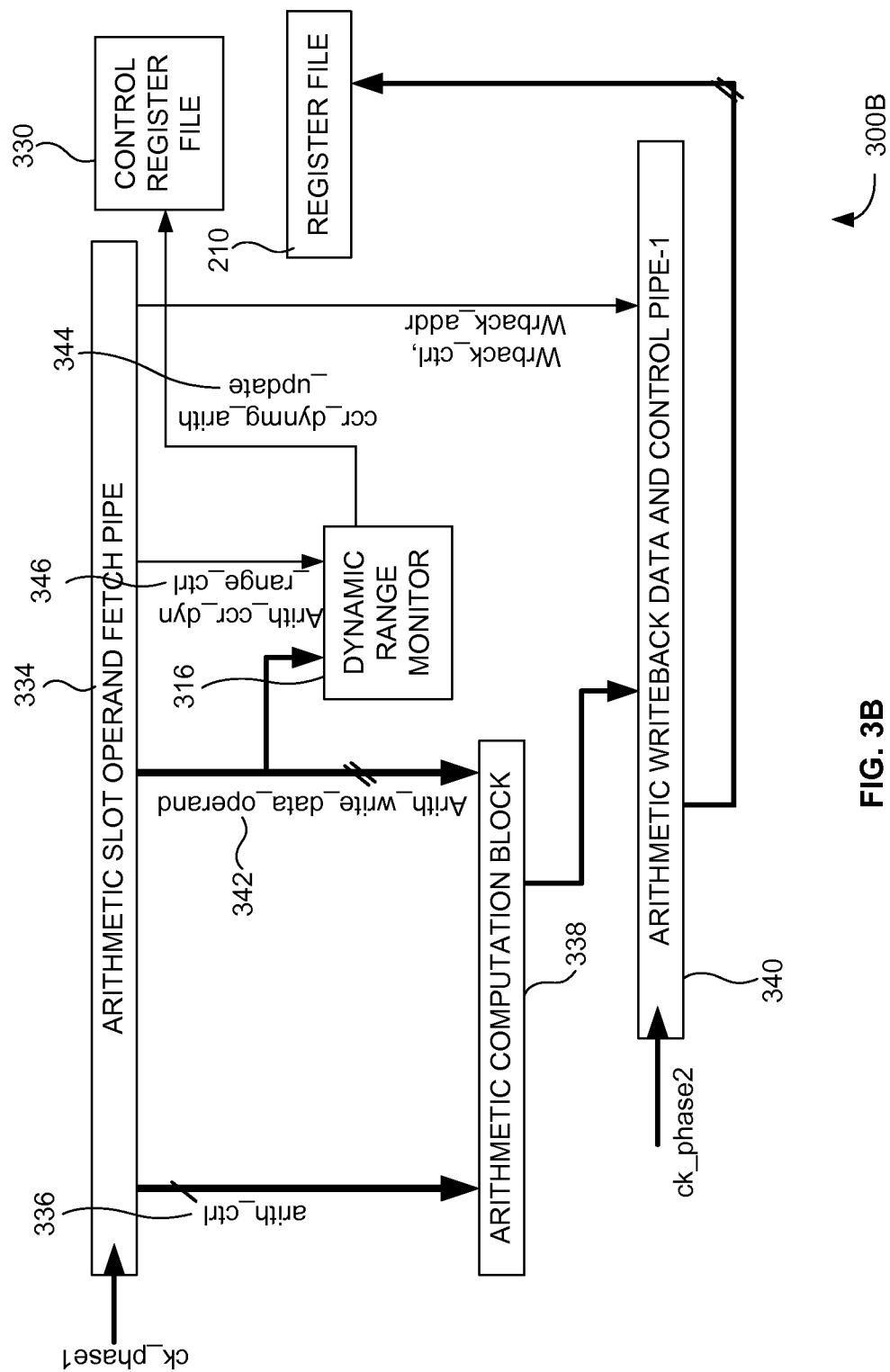
FIG. 3B illustrates an exploded view of the Arithmetic Slot of FIG. 2 for Arithmetic operations and dynamic range monitoring according to an embodiment herein.

With reference to FIG. 3A, FIG. 3B illustrates an exploded view of the arithmetic slot of FIG. 2 for an arithmetic operation and dynamic range monitoring according to an embodiment herein. The arithmetic slot of FIG. 2 for an arithmetic operation and dynamic range monitoring includes the dynamic range monitor block 316 of FIG. 3A, an arithmetic slot operand fetch unit 334, an arithmetic control signal 336, an arithmetic computation block 338, an arithmetic writeback data and control pipe-1 block 340, an arithmetic write data operand 342, an arithmetic control register dynamic range update signal 344, and an arithmetic control register dynamic range control signal 346.

The CPU 200 can perform the dynamic range monitoring in the arithmetic unit. During any CPU operation, the arithmetic unit fetches the required operands (e.g., an arithmetic write data operand 342) from the register file 210, where data would be preloaded using any memory read operation. During the pipelined stages of CPU operation the required operands are fetched by the arithmetic slot through the arithmetic decode and operand fetch unit 212 and propagated to the arithmetic unit via the respective operand fetch pipe. The dynamic range monitoring block 316 can snoop on the arithmetic write data operand 342 (e.g., the arith_write_data_operand 342) and compute an appropriate dynamic range while other operations are concurrently ongoing in the arithmetic unit. The active to inactive transition of the CPU control register dynamic range control bit signals of the dynamic range monitoring 316 can be turned off and the previous value of dynamic range calculated can be latched.

Figure 3C:
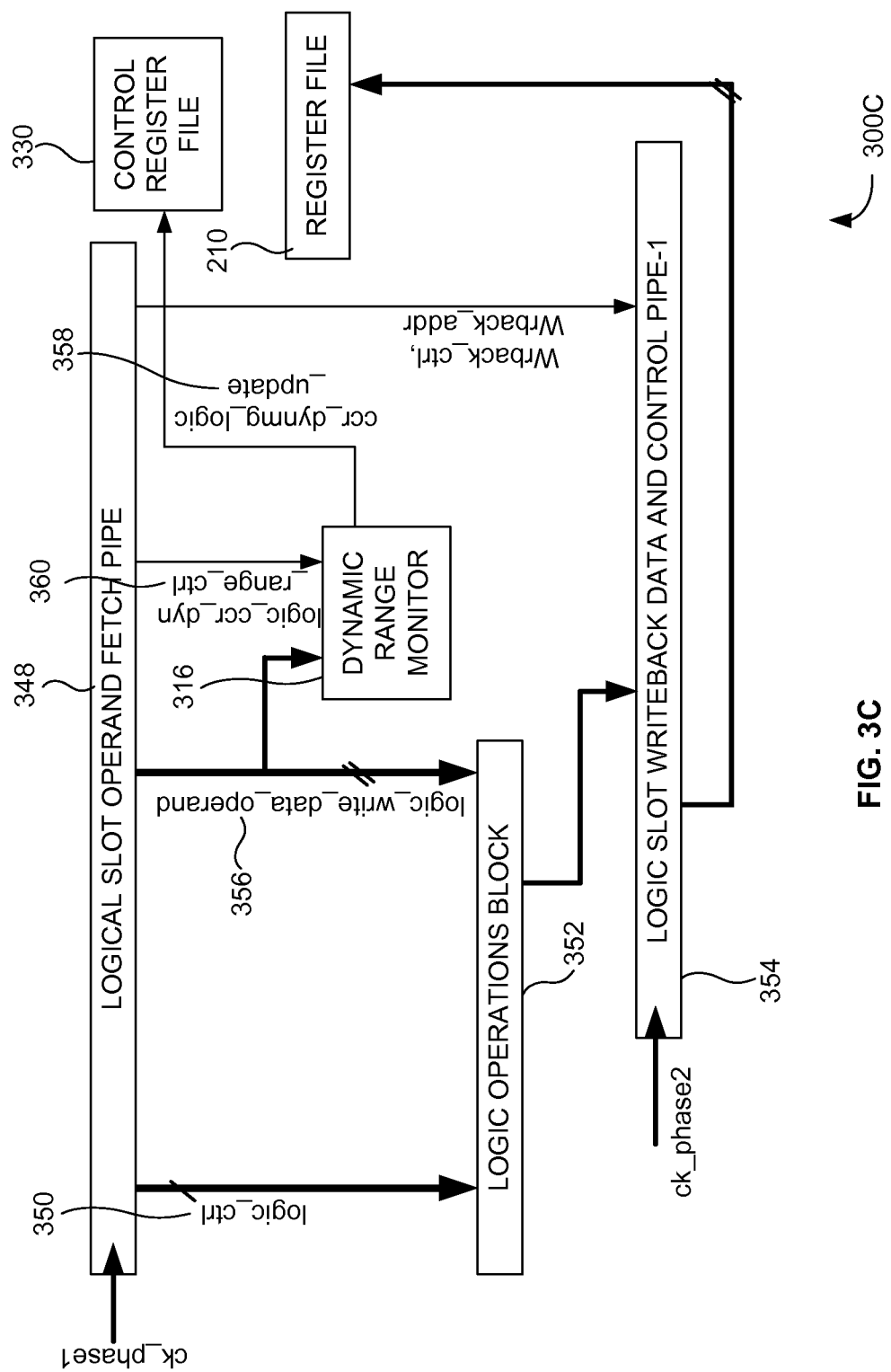
FIG. 3C illustrates an exploded view of the Logic function Slot of FIG. 2 for a logical functional operation and dynamic range monitoring according to an embodiment herein.

With reference to FIG. 3A, FIG. 3C illustrates an exploded view of the logic function slot of FIG. 2 for a logical functional operation and dynamic range monitoring according to an embodiment herein. The logic function slot of FIG. 2 for a logic function operation and dynamic range monitoring includes the dynamic range monitor block 316 of FIG. 3A, an logic slot operand fetch unit 348, an logic control signal 350, an logic operations block 352, a logic slot writeback data and control pipe-1 block 354, a logic write data operand 356, an logic control register dynamic range update signal 358, and a logic control register dynamic range control signal 360.

The CPU 200 can perform the dynamic range monitoring in the logical function unit. During any CPU operation, the logical function unit fetches the required operands (e.g., a logic write data operand 356) from the register file 210, where data would be preloaded using any memory read operation. During the pipelined stages of CPU operation the required operands are fetched by the logic slot through the logical function decode and operand fetch unit 214 and propagated to the logic function unit via the respective operand fetch pipe. The dynamic range monitoring block 316 can snoop on the logic write data operand 356 (e.g., the logic_write_data_operand 356) and compute an appropriate dynamic range while other operations are concurrently ongoing in the arithmetic unit. The active to inactive transition of the CPU control register dynamic range control bit signals of the dynamic range monitoring 316 can be turned off and the previous value of dynamic range calculated can be latched. Hence no additional overhead CPU cycles are required while dynamic range of signals is computed in these units also. Thus, the dynamic range is detected in at least one of a load store unit, an arithmetic unit, and a logical function unit. In one embodiment, the dynamic range can be detected in any of the load store slot with dynamic range monitoring 206A and 208B, the arithmetic slot of FIG. 2 and/or in the logic function unit of FIG. 2.

With reference to FIG. 3A, FIG. 3D illustrates an input block data of a Q.J digit fixed point number with one sign bit to the dynamic range monitor block 316 of FIG. 3A according to an embodiment herein. In the block data of dynamic range monitor 300D and 300E, a Q.J digit fixed point number with one sign bit is shown. With reference to FIG. 3D, FIG. 3E illustrates the input block data of the Q.J digit fixed point number with one sign bit to the dynamic range monitor block 216 of FIG. 3A when the sign bit is same as a first "K" fractional bits according to an embodiment herein. The sign bit is same as first "K" fractional bits i.e. s=b0=b1=b2= . . . =b (k−1). In FIG. 3C, the first K bits from MSB side are same as sign bit. The computation can be done considering the number as Q. (J−K) and later be scaled down by multiplying the result with $2^{-K}$.

Figure 3F:
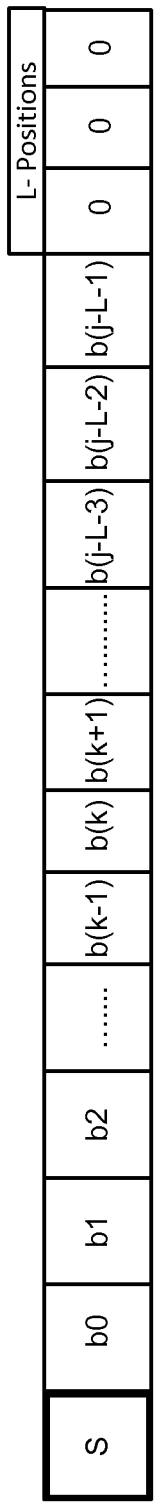
FIG. 3F illustrates the input block data of the Q.J digit fixed point number with one sign bit with last "L" bits as zeros to the dynamic range monitoring of FIG. 3A according to an embodiment herein.
Figure 3G:
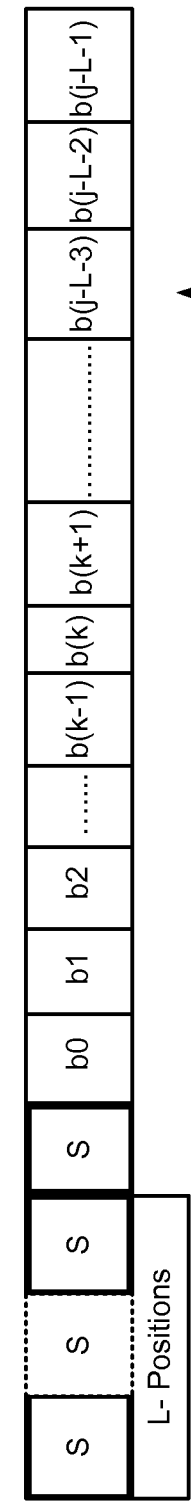
FIG. 3G illustrates the input block data of the Q.J digit fixed point number with one sign bit to the dynamic range monitoring of FIG. 3A when divided by $2^L$ according to an embodiment herein.

With reference to FIG. 3E, FIG. 3F illustrates the input block data of the Q.J digit fixed point number with one sign bit 300F to the dynamic range monitoring 316 of FIG. 3A according to an embodiment herein. With reference to FIG. 3E, FIG. 3G illustrates the input block data of the Q.J digit fixed point number with one sign bit 300G to the dynamic range monitoring 316 of FIG. 3A when divided by $2^L$ according to an embodiment herein. A Q.J digit fixed point number with one sign bit is shown below with last "L" bits as zeros. In this case, the sign bit is same as first "K" fractional bits i.e. s=b0=b1=b2= . . . =b (k−1). To ensure that arithmetic units are better utilized the above number is divided by $2^L$.

Figure 3H:
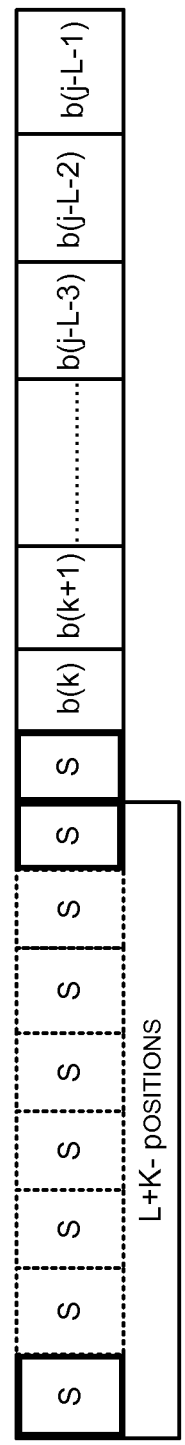
FIG. 3H illustrates the input block data of the Q.J digit fixed point number with one sign bit to the dynamic range monitoring of FIG. 3A when the sign bit is same as first "L+K" fractional bits according to an embodiment herein.

With reference to FIG. 3G, FIG. 3H illustrates the input block data of the Q.J digit fixed point number with one sign bit 300H to the dynamic range monitoring 316 of FIG. 3A when the sign bit is same as first "K" fractional bits according to an embodiment herein. In the FIG. 3H, the data has all the first L+K bits from MSB side same as sign bit. The computation can be done considering the number as Q.(J−L−K) and later be scaled down by multiplying the result with $2^{-L-K}$. For this case, when a block of data of the input signal has L trailing zeros, the computation is done such that the overall post scaling factor used is $2^{-(L+K)}$ and finally after all steps are done the result is multiplied by $2^L$. A logic circuit (not shown) detects a maximum exponent (maxexp) which is equal to L+K above and also stores the number of trailing zeros (named trexp) which is equal to L.

Figure 4:
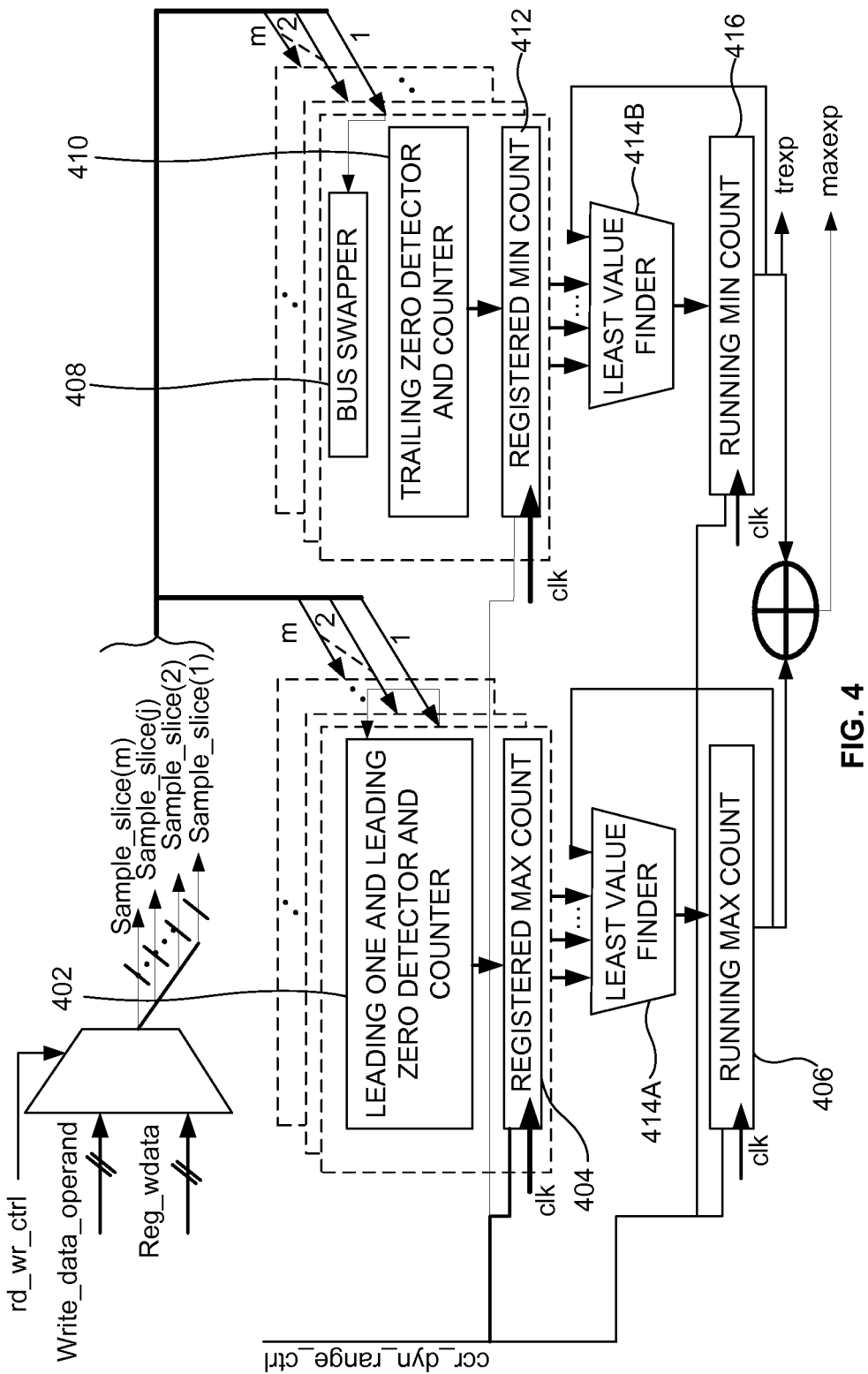
FIG. 4 illustrates an exploded view of the dynamic range monitor block of FIG. 3A or FIG. 3B or FIG. 3C according to an embodiment herein.

FIG. 4 illustrates an exploded view of the dynamic range monitor block 316 of FIG. 3A according to an embodiment herein. The dynamic range monitor block 316 includes a leading zero and leading one detector and counter 402, a registered maximum count indicator 404, a running maximum count indicator 406, a bus swapper 408, a trailing zeros detector and counter 410, a registered minimum count indicator 412, a least value finder 414A, a least value finder 414B, and a running minimum count indicator 416. The data (e.g., read data or written data of the input signal) on which dynamic monitoring is to be done is selected using a multiplexer. The data are split into "m" sub-words of significance shown as sample_slice(1), sample_slice(2), . . . upto sample_slice(m). Each of these sub-words is acted upon with the leading zero or leading one detector as well as a trailing zeros detectors.

The leading zero or leading one detector 402 detects a count of leading zeros and leading ones for each sub-word of the outgoing write data and the incoming memory read data of the input signal. In one embodiment, the leading zero or leading one detector 302 detects the dynamic range of the input signal. The outgoing write data and incoming memory read data are snooped by detecting the count of leading zeros and leading ones for each sub-word of the outgoing write data and the incoming memory read data of the input signal. The registered maximum count 404 stores the count of leading zeros and leading ones as a registered maximum count. In one embodiment, the registered maximum count stores the count of leading zeros and leading ones for each sub-word of the outgoing write data and the incoming memory read data of the input signal. A similar process is followed for different sub-words and the least value amongst all and any previous least value is found using the least value finder 414A determines a least value of the count of said leading zeros and leading ones over a block of data and stores in the running maximum count indicator 406. The running maximum count indicator 406 maintains the smallest possible value of K over a block of data of the input signal. In one embodiment, the running maximum count indicator 406 maintains a least value of the count of the leading zeros and leading ones over the block of data of the input signal.

The bus swapper 408 bus-swaps each sub-word of the outgoing write data and the incoming memory read data such that (i) a most significant bit (MSB) position of the each sub-word occupies a least significant bit (LSB) position, and (ii) a LSB position of the each sub-word occupies a MSB position. This swapped data bus is processed to find the leading zeros. A combination of the bus swapper 408 and the trailing zeros detector and counter 410 enables determining the number of trailing zeros. The trailing zeros detector and counter 410 detects a count of trailing zeros for the each sub-word of the outgoing write data and the incoming memory read data of the input signal. The registered minimum count indicator 412 stores the count of trailing zeros for each sub-word of the outgoing write data and the incoming memory read data as a registered minimum count.

A similar process is followed for different sub-words and the least value amongst them and any previous least value is determined using the least value finder 414B and stored in the running minimum count indicator 416. The least value finder 414B determines a least value of the count of trailing zeros over the block of data. The running minimum count indicator 416 maintains the smallest possible value of 'L' over a block of data of the input signal. In one embodiment, the running minimum count indicator 416 stores a least value of the count of trailing zeros over a block of data of the input signal. The value 'L' is stored as trexp and L+K is stored as a maximum exponent value (e.g., maxexp). The computed value of maxexp is latched into the CPU Control register 202 when the CPU control register dynamic range control bit is cleared to zero, using a high to low transition. In one embodiment, the maximum exponent value is the dynamic range that is detected by adding the least value of the count of the leading zeros and leading ones over the block of data and the least value of a count of trailing zeros over the block of data.

At the start of the operation, before turning on the dynamic range monitoring for a given load-store unit, the registers registered minimum count indicator 412, the registered maximum count 404, the running maximum count indicator 306, and the running minimum count indicator 416 are preset to a highest possible value so that the previous values are not used. In one embodiment, the count of leading zeros and leading ones, the smallest value of the count of the leading zeros and leading ones, the count of trailing zeros, and the smallest value of the count of trailing zeros are preset to a highest possible value before detecting the dynamic range.

Using the contents of maxexp register, an optimum scaling factor is calculated for required different types of operation programmatically. The optimum scaling factor (e.g., a block floating point (BFP) scaling factor) is computed based on the dynamic range. In one embodiment, the block floating point (BFP) scaling factor is computed using a scaling factor computation module that may reside in the dynamic range monitor block 316 of FIG. 3 or in the CPU 200 of FIG. 2. In one embodiment, the scaling factor computation module is implemented as a logically self contained part of a software program that when executed computes a scaling factor (e.g., using the methods described herein or any other method known in the art). In another embodiment, the scaling factor computation module is implemented as a self-contained hardware component.

In one embodiment, a best dynamic range is programmatically selected based on different classes of the input signal and corresponding scaling factors. Some of these scaling factors which are usually used in signal processing are as follows:
1. Scaling by sum of magnitude of impulse response (L1 norm): In this method, the magnitude of a digital system (e.g., a receiver) at any node should be less than 1 for a system using Q.15 format. If the maximum input signal Xmax to the digital system is $(1-2^{-15})$, the output of the digital system is restricted to $\{y(n)\}<1$ provided that the scaling factor is limited by:

$$G<1/\{X\max*\text{Sigma}[\text{mod } Hk] \text{ for } k \text{ ranging from 0 to } N-1\}.$$

Where Hk is the impulse response of a filter with length N. The summation term sigma [mod Hk] for k ranges from 0 to N−1 which is called L1 norm.
2. Scaling by square root of sum of squared magnitude of impulse response (L2 norm). The scaling factors which can be used are as follows:

$$G<1/\{X\max*\text{Sqrt}(\text{Sigma}[H(k)2] \text{ for } k \text{ ranging from 0 to } N-1.)\}.$$

The above norm is called L2 norm and is always lesser than L1.
3. Scaling by maximum of frequency response (Chebyshev norm). The preceding methods in 1 and 2 are useful for wideband signals. The third method to determine the scaling factor is applicable when the input is narrowband signal. In this method, the magnitude response at the input frequency is first determined which is multiplied by the maximum input signal Xmax to determine the scaling gain in accordance with the equation:

$$G<1/\{X\max*\max[H(wk)]\}$$

The term max [H (wk)] is known as the Chebyshev norm of the frequency response H (w). This guarantees that the steady state response of the system to a sine-wave input will never overflow.

Since the Xmax value are known, by using the maxexp contents (e.g., maximum exponent) for a block of data, a scaling factor (which could be scale-up or scale-down) may be derived which will ensure that the output is stable and does not exceed the required precision range for a given class of signal processing function. The value of trexp (e.g., number of trailing zeros) is also maintained in a separate control register for further processing at the end of all stage wise signal processing functions. It is assumed that since Frequency response is known in all such scenarios. Similarly, scaling factors can be derived for spectral decomposition operations like Fast Fourier transform on a stage by stage basis.

Figure 5:
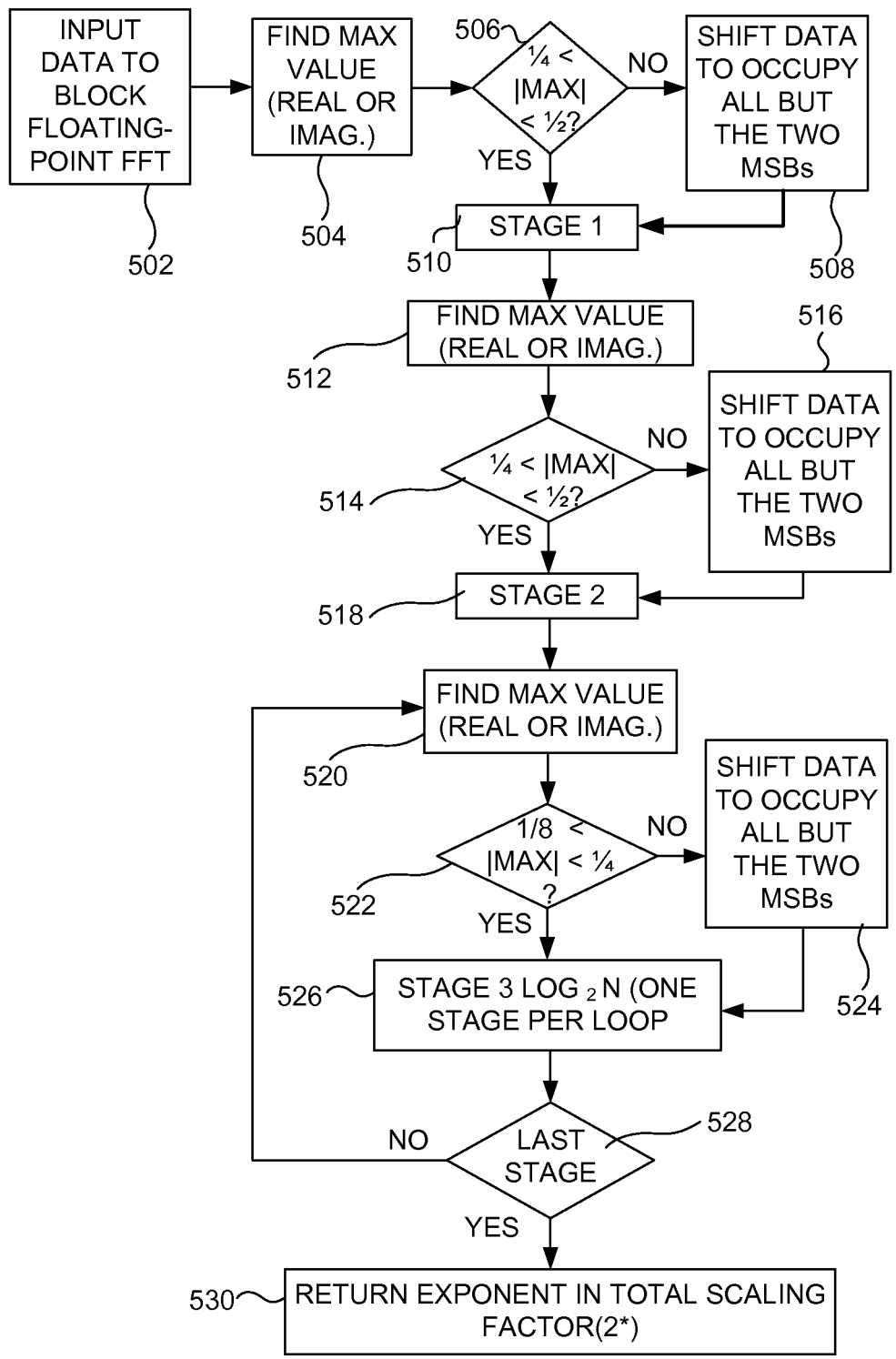
FIG. 5 is a flowchart illustrating a method of block floating point Fast Fourier transform (FFT) using block floating point algorithm according to an embodiment herein.

FIG. 5 is a flowchart illustrating a method of block floating point Fast Fourier transform (FFT) using block floating point algorithm according to an embodiment herein. For example, a block floating point Fast Fourier transform operation is considered. In step 502, an input data is provided to the Block Floating Point Fast Fourier transform operation. In step 504, the input data is scaled to the first stage of the complex FFT to occupy the maximum possible dynamic range that allows for a single bit growth in the upcoming stage. In one embodiment, a maximum value (e.g., a maximum datum) is determined (e.g., a maximum value of a real or imaginary part).

In step 506, it is checked whether the maximum datum lies between 0.25 (8192 in Q.15) to 0.5 (16384 in Q.15). If the maximum datum lies between 0.25 (8192 in Q.15) to 0.5 (16384 in Q.15), then the input array is normalized by some power of two that gives the maximum datum room for one bit of growth. In step 508, if the maximum datum does not lie between 0.25 (8192 in Q.15) to 0.5 (16384 in Q.15), then the input data is shifted to occupy MSBs. In step 510, the first stage data operation is performed. The data in the subsequent radix-2 stage increases by either zero or one bit. If there is no increase or only fractional increase occurs, then scaling operation is not performed.

In step 512, a maximum value of real or imaginary part is identified. In step 514, it is checked whether the maximum datum lies between 0.25 (8192 in Q.15) to 0.5 (16384 in Q.15). If the maximum datum does not lie between 0.25 (8192 in Q.15) to 0.5 (16384 in Q.15), then the input data is shifted to occupy all but 2 MSB's in step 516. If any real or imaginary data increases by one bit, then all values are scaled down by one bit to prepare for bit growth in a second stage 518. The data in the subsequent radix-2 stage then increases by either zero or one bit. If no increase or only fractional increase occurs, then scaling is not performed.

In step 520, it is checked whether if any real or imaginary data increases by one bit from the maximum value of real or imaginary outputs from previous step. In step 522, it is checked whether the maximum datum lies between ⅛ (4096 in Q.15) to 0.25 (4096 in Q.15). If maximum datum does not lie between ⅛ (4096 in Q.15) to 0.25 (4096 in Q.15), then input data is shifted to occupy all but 2 MSB's in step 524. If maximum datum lies between ⅛ (4096 in Q.15) to 0.25 (4096 in Q.15), then the log$_2$N stages (one stage per loop) is performed in step 526.

The input data is scaled by some factor of two that allows for two bits of growth. In one embodiment, the maximum datum must lie between ⅛ (4096 in Q.15) and 0.25 (8192 in Q.15) to prevent overflow yet maximize the dynamic range and the block exponent of the output magnitude can be recovered. In step 528, scaling factors are recorded from each stage and it is checked whether it is the last stage. If it is the last stage, the total number of shifts (e.g., the block common exponent) is returned to allow the proper output magnitude to be recovered in step 530. Else, the step 520 is repeated.

Figure 6:
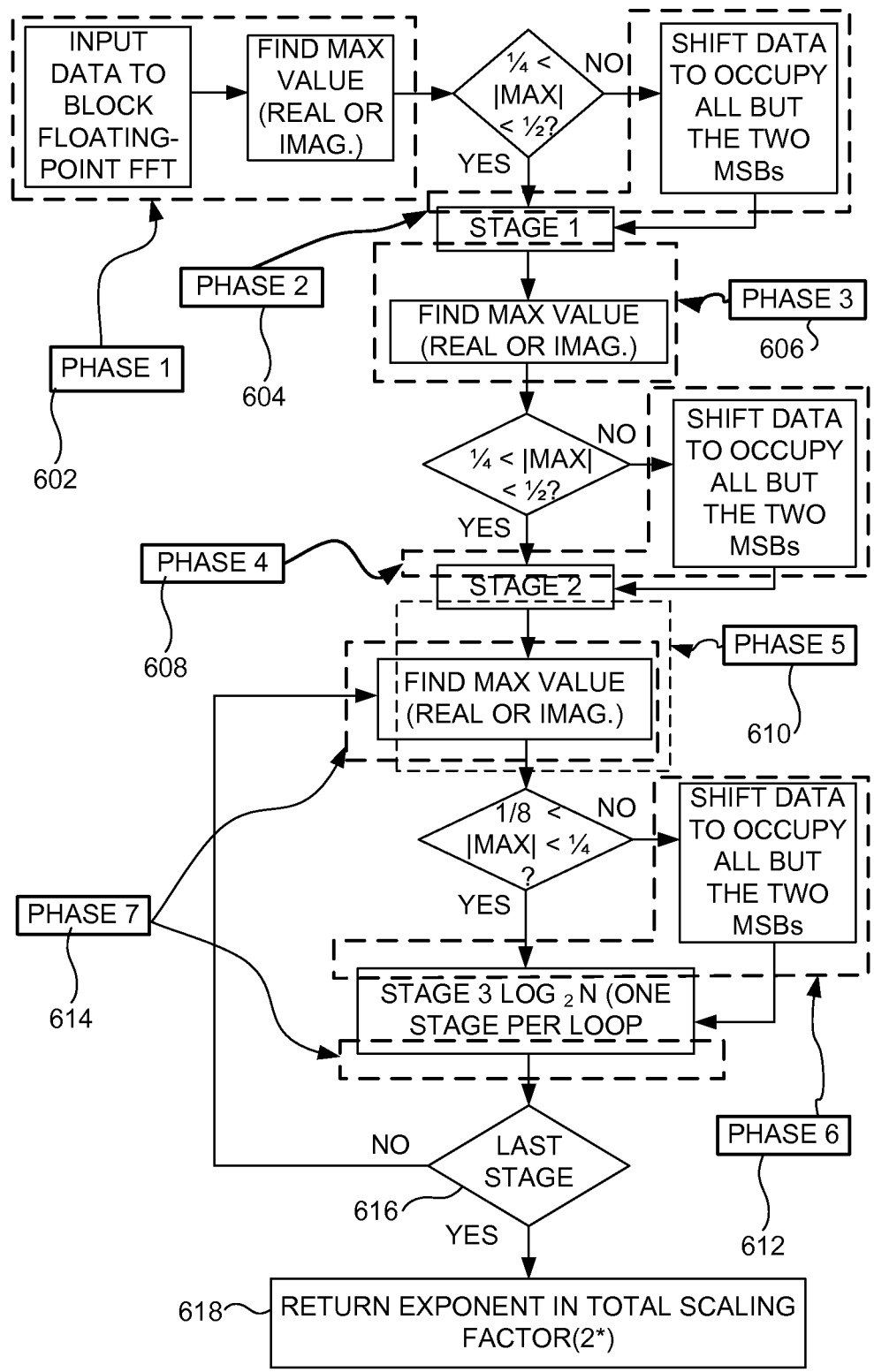
FIG. 6 is a process flow illustrating a block floating point FFT with dynamic range monitoring according to an embodiment herein.

With reference to FIG. 5, FIG. 6 is a process flow illustrating a block floating point FFT with dynamic range monitoring according to an embodiment herein. In particular, FIG. 6 illustrates block floating point FFT that scheduled on the CPU 200 with dynamic range monitoring where the different phases are overlaid. In step 602, phase 1 depicts the stage when maximum value is found for the incoming block of data. This phase can be totally consumed, when the input data is being read by the load-store unit of the VLIW CPU (or any DSP Processor) or when this data is being written out by the previous signal processing stage. The dynamic range monitoring is performed in this phase and the value is registered in CPU Control register 202 for use in next stage. Using this value, the evaluation of the condition ¼<|Max|<½ is done in arithmetic or logical functional slot as shown in FIG. 2. The result of evaluation decides the pre-scaling or post-scaling value for the next arithmetic computation.

In step 604, the phase 2 is carried out using the arithmetic slot which is capable of embedding such scaling operations along with arithmetic functions. Finally, the phase when data is written out as the operation of Stage 1 and, the max value of this block of data that has to be determined are combined as part of phase 3 in step 606. The load-store unit performs the dynamic range monitoring as a part of the store operations embedded as part of stage 1. In step 608, the phase 4 the stage 2 is carried out using the arithmetic slot which is capable of embedding such scaling operations along with arithmetic functions. Finally, the phase when data is written out as the operation of stage 2 and the max value of this block of data that has to be determined are combined as part of Phase 5 in step 610.

In step 612, the phase 6 is carried out using the arithmetic slot which is capable of embedding such scaling operations along with arithmetic functions. Finally, the phase when data is written out as the operation of stage 3 and the max value of this block of data that has to be determined are combined as part of phase 7 in step 614. In step 616, it is checked whether it is the last stage. If it is the last stage, the total number of shifts (e.g., the block common exponent) is returned to allow the proper output magnitude to be recovered in step 618. Else, if it is not the last stage the step 614 is repeated. Note that, in all intermediate stages where the task of finding out, if the data is within a range like ¼<|Max|<½ or ⅛<|Max|<¼ is required, this is done in the arithmetic unit using the scaling factors found in the previous stages. Thus the block floating point FFT can be efficiently done on the CPU 200 without any overhead cycles.

The instruction set support for handling block floating point is implemented in an arithmetic execution slot. The arithmetic execution slot performs operations on both real and complex blocks of data or signals. It has 3 dedicated scaling registers (SCALEREG1,SCALEREG2 and SCALEREG3) which are selectable for any arithmetic operation. Each of the scaling registers has the following 3 fields, which can be used to pre-scale the sources of post-scale the final result. The most frequently used operation is post-scaling the result.

a) Dest_po (Bits 4-0) is used for post-scaling the result before writing them to the destination register.

b) Src2_pre (Bits 9-5) is used for pre-scaling the second source of an arithmetic operation.

c) Src1_pre (Bits 14-10) is used for pre-scaling the first source of an arithmetic operation.

The following arithmetic operations are supported with 2 source operands and 1 destination operand. Both the source operands are capable each being pre-scaled using the fields Src1_pre and Src2_pre. In addition, the destination output can be post-scaled using the field Dest_po.

A) Complex Multiply and Complex Conjugate Multiply Operations and the SIMD versions (with 2-way simd).

a) CMUL src1,src2,dest,#sc_offset

This instruction is used for complex multiply. Assume that Z1 and Z2 are 2 complex numbers. Then Z1×Z2=[Real part (src1_hi)+j Imag part (src1_lo)]×[Real part (src2_hi)+j Imag part (src2_lo)]==>[Real__32bit (dest1H)+j Imag__32bit(dest1L)].

Real__32bit(dest1H)=(src1_hi*src2_hi)−(src1_lo*src2_lo);

Imag__32bit(dest1L)=(src1_lo*src2_hi)+(src1_hi*src2_lo);

The Real and Imaginary parts of the 32 bit result are down-scaled using the contents of the post-scale register to generate a 16 bit Real and 16 bit Imaginary value.

Scale {Re_Result1__32(dest1H)}==>dest1_hi;

Scale {Im_Result1__32(dest1L)}==>dest1_lo;

The immediate #sc_offset field (2 bit) is used to select the post-scale register of choice.

b) CNMUL src1,src2,dest,#sc_offset

This instruction is similar to CMUL except that it multiply Z1 and conjugate of Z2.

c) CMUL2 [src1_o:src1_e],[src2_o:src2_e],[dest1_o:dest1_e], #sc_offset

This instruction is a 2way SIMD version of CMUL instruction.

d) CNMUL2[src1_o:src1_e],[src2_o:src2_e],[dest1_o:dest1_e], #sc_offset

This instruction is a 2way SIMD version of CNMUL instruction.

B) Real Multiply Operations and SIMD versions (with 2-way and 4-way simd)

a) RMUL src1,src2,dest,#sc_offset

This instruction is used for Real Multiplication of two numbers.

Re1__16(src1)×Re2__16(src2)]==>Post-Scale{[Result1__32}==>[Result1__16(dest1)].

In case of this instruction the post-scale values are chosen based on the post-scale register specified by #sc_offset (2 bits).

b) RMUL2 src1,src2,dest,#sc_offset

This instruction is a 2way SIMD version of RMUL instruction.

c) RMUL4 [src1*o*:sr1*e*],[src2*o*:src2*e*],[dest_o:dest_e], #sc_offset

This instruction is a 4way SIMD version of RMUL instruction.

C) Radix-2 DIT (Decimation in Time) Butterfly Operation a) BTRT [src_o:src_e], TwiddleReg, dest_hi, dest_lo, #sc_offset This instruction is used to perform a Butterfly operation using DIT algorithm.

dest_hi=src_e+(src_o*TwiddleReg);

dest_lo=src_e−(src_o*TwiddleReg);

The final dest_hi and dest_lo values will be post-scaled to fit in a 16 bit format.

The sources registers are in a 64 bit ODD:EVEN Register pair. The Twiddle Reg used here includes the Twiddle values used for FFT computation. The immediate offset#sc_offset field (2 bit) is used to select the post-scale and pre-scale register of choice.

The lower sample is expected to be placed in the even register while the upper sample is expected to be placed in the Odd register. The contents of src1_pre and src2_pre fields are used to uniformly pre-scale only src_o and src_e sources.

D) Radix-2 DIF (Decimation in Frequency) Butterfly Operation a) BTRF src1, src2, TwiddleReg, dest_lo_o:dest_hi_e, #sc_offset This instruction is used to perform a Butterfly operation using DIF algorithm.

dest_hi_e=src1+src2;

dest_lo_o=(src1−src2)*TwiddleReg;

The final dest_hi and dest_lo values will be post-scaled to fit in a 16 bit format. The destination registers are in a 64 bit ODD:EVEN register pair. The Twiddle Reg used here includes the relevant Twiddle value used for FFT computation. The field #sc_offset is used to select the post-scale and pre-scale register of choice. The contents of src1_pre and src2_pre fields are used to uniformly pre-scale only src1 and src2 sources.

FIG. 7 is a table view illustrating pre-scaling of source operand 700 according to an embodiment herein. The table view of pre-scaling of source operand 700 includes an input assumed field 702, a pre-scale factor field 704, and an output of pre-scale operation field 706. The input assumed field 702 includes one or more values that are assumed to be Q.15 numbers of the type S.d0-d1-d2-d3-d4-d5-d6-d7-d8-d9-d10- d11-d12-d12-d14. The pre-scale factor field 704 includes one or more value ranges from minus one (−1) to 15. The pre-scaling operation field 706 includes one or more outputs based on source operands that are equivalent to a left shift operation with the sign bit intact, except for the case when pre-scale factor is minus one (output pre-scale operation=Input assumed*(2^(+prescale_factor)).

FIGS. 8A and 8B are table views illustrating post scaling with real multiplies operation 800A and 800B according to an embodiment herein. The table view of the post scaling with real multiply 800A and 800B includes an input assumed field 802, a post-scale factor field 804, and an output of post scale operation field 806. The input assumed field 802 includes one or more values that are 32 bits of the format S_S_.d0-d1-d2-d3-d4-d5-d6-d7- . . . -d13-d14-d15- . . . -d24-d25-d26- . . . -d27-d28-d29. The post-scale factor field 704 includes one or more values that ranges from −16 to +15. The output of post scale operation field 706 includes output that is equivalent to a left shift operation if positive and right shift operation if it is negative, with the sign bit intact. The results shown as outputs in the FIG. 8A and FIG. 8B depict how the sign position of the intermediate result transforms when inputs to the multiplier are both in Q.15 format. The final result taken as 16 bits is to be interpreted in Q.15 format (output post-scale operation=Input assumed (in last 31 bits)*(2^(postscale_factor)).

FIG. 9A and FIG. 9B are table views illustrating post scaling with complex multiply table 900A and 900B according to an embodiment herein. The table view of post scaling with complex multiply table 900A and 900B includes an input assumed field 902, a post-scale factor field 904, and an output of post-scale operation field 906. The input assumed field 902 includes one or more values that are 32 bits of the format S_Ix_d0-d1-d2-d3-d4-d5-d6-d7- . . . d13-d14-d15- . . . d24-d25-d26-d27-d28-d29. The post-scale factor field 904 includes one or more values that ranges from −16 to +15. The output of post-scale operation field 906 includes output that is equivalent to a left shift operation if positive and right shift operation if it is negative, with the sign bit intact (output post-scale operation=Input assumed (in last 31 bits) *(2^(postscale_factor)).

Figure 10:
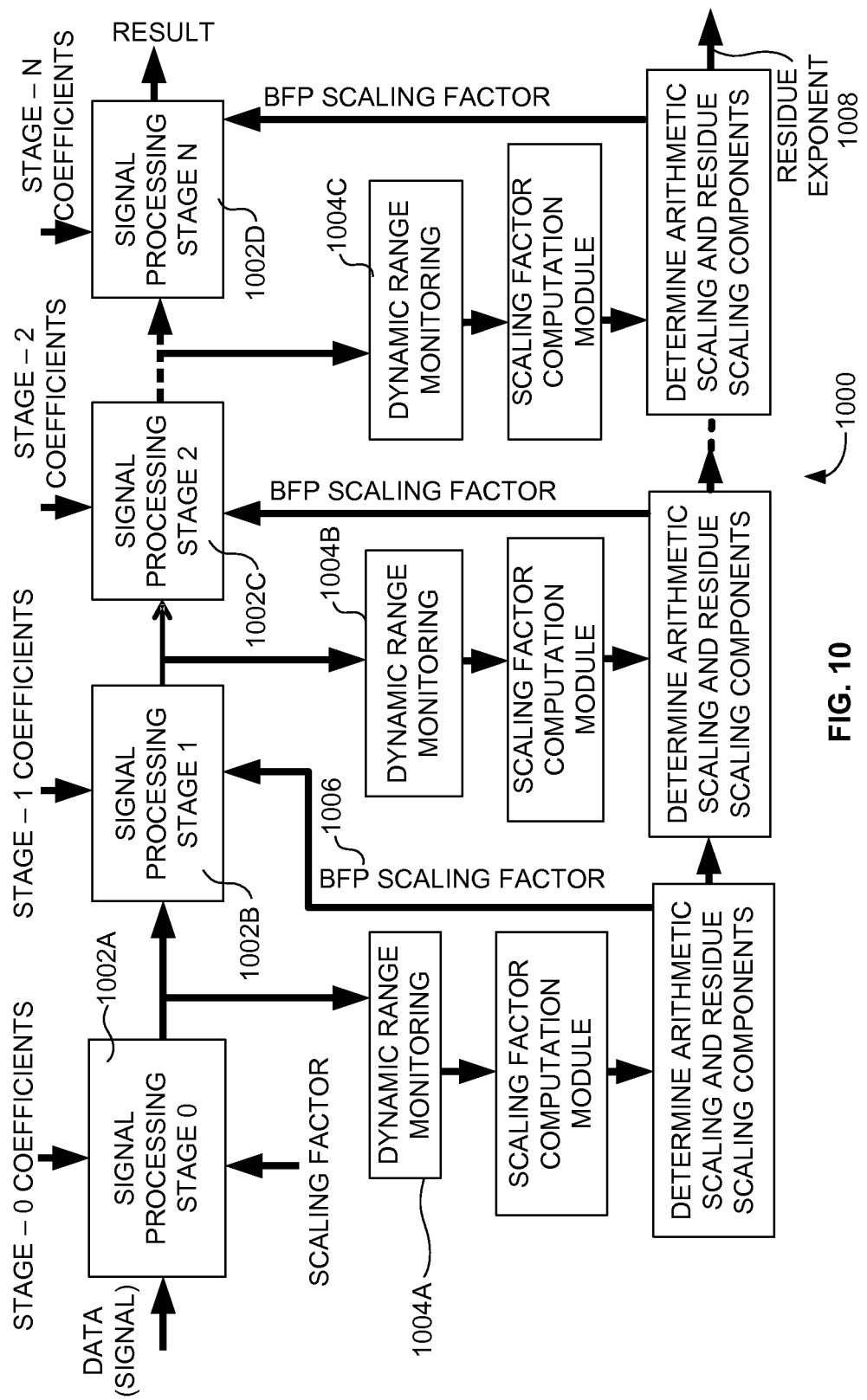
FIG. 10 illustrates a method for implementing a block floating point by detecting a dynamic range while performing store operations in the CPU of FIG. 2 without additional overhead cycles according to an embodiment herein.

FIG. 10 illustrates a method for implementing a block floating point by detecting a dynamic range while performing store operations in the CPU 200 of FIG. 2 without additional overhead cycles according to an embodiment herein. The example of dynamic range monitoring 1000 used during store operations shows a signal processing stage0 1002A, a signal processing stage1 1002B, a signal processing stage2 1002C, and subsequent signal processing stages upto stage N 1002D. Each of these stages has dynamic range monitoring feature 1004A-1004C as shown. Consider a filtering operation where the dynamic range of coefficients is already known. One or more store units of the load-store slot with dynamic range detection for unit1 206B, and the load-store slot with dynamic range detection for unit2 208B are configured for a memory store or load operation. The signal chain shows several filters in cascade which can be scheduled either on one DSP processor (e.g., in the CPU 200 of FIG. 2) or multiple digital signal processors (DSPs)(e.g., using the same CPU 200 by cascading). For the filtering operations occurring in stage0 1002A, a known scaling factor obtained is computed from previous stage. If the scaling factor is unknown then a fixed scaling factor is used for data.

The output of the stage0 1002A signal processing stage is stored in the last stage and during this process the dynamic range in monitored. Since, the dynamic range of coefficient is known the required scaling factor of the result can be easily computed based on the type of signal processing operation in stage1 1002B. The outgoing write data of the input signal is snooped to detect the dynamic range. In one embodiment, a count of leading zeros and leading ones for each sub-word of the outgoing write data of the input signal is detected for detecting the dynamic range. The outgoing write data is latched in an operand fetch phase by writing on a memory of the CPU 200. This scaling factor 1006 computed (BFPScalingFactor) is then used for stage1 1002B operations to maximally utilize the available arithmetic bit width. In one embodiment, it is determined whether stage1 is a first stage.

A block floating point (BFP) scaling factor is obtained from a previous stage when the stage is not the first stage (e.g., stage 11002B). A new BFP scaling factor is computed for a second stage based on the dynamic range. An input data for the second stage is shifted using the new BFP scaling factor along with a load operation. Arithmetic scaling and residue scaling components of the new BFP scaling factor may be determined, and the BFP scaling factor is set to zero when the stage is the first stage. The new BFP scaling factor is computed based on the dynamic range that is detected by snooping an outgoing write data of the input signal and latching the outgoing write data in an operand fetch phase by writing on a memory of the DSP (e.g., the CPU 200 of FIG. 2). The BFP scaling factor and the new BFP scaling factor are computed using a scaling factor computation module.

It may be determined whether the second stage is a last stage. If the second stage is the last stage then arithmetic scaling and residue scaling components of the new BFP scaling factor are determined for the last stage. A residue exponent 1008 may be computed by scaling the residue scaling components of the first stage until the last stage. While storing the final outputs of stage1 1002B, the store unit performs the dynamic monitoring of the processed outputs. This process is then used iteratively across different stages upto stage N of subsequent processing. The different scale factors corresponding to maxexp values used at each stage (s1, s2, s3, . . . , sN) are used in the final stage to scale up the result with the exponent value ($2^{(s1+s2+s3+\ldots+sN)}$) 1008.

Figure 11:
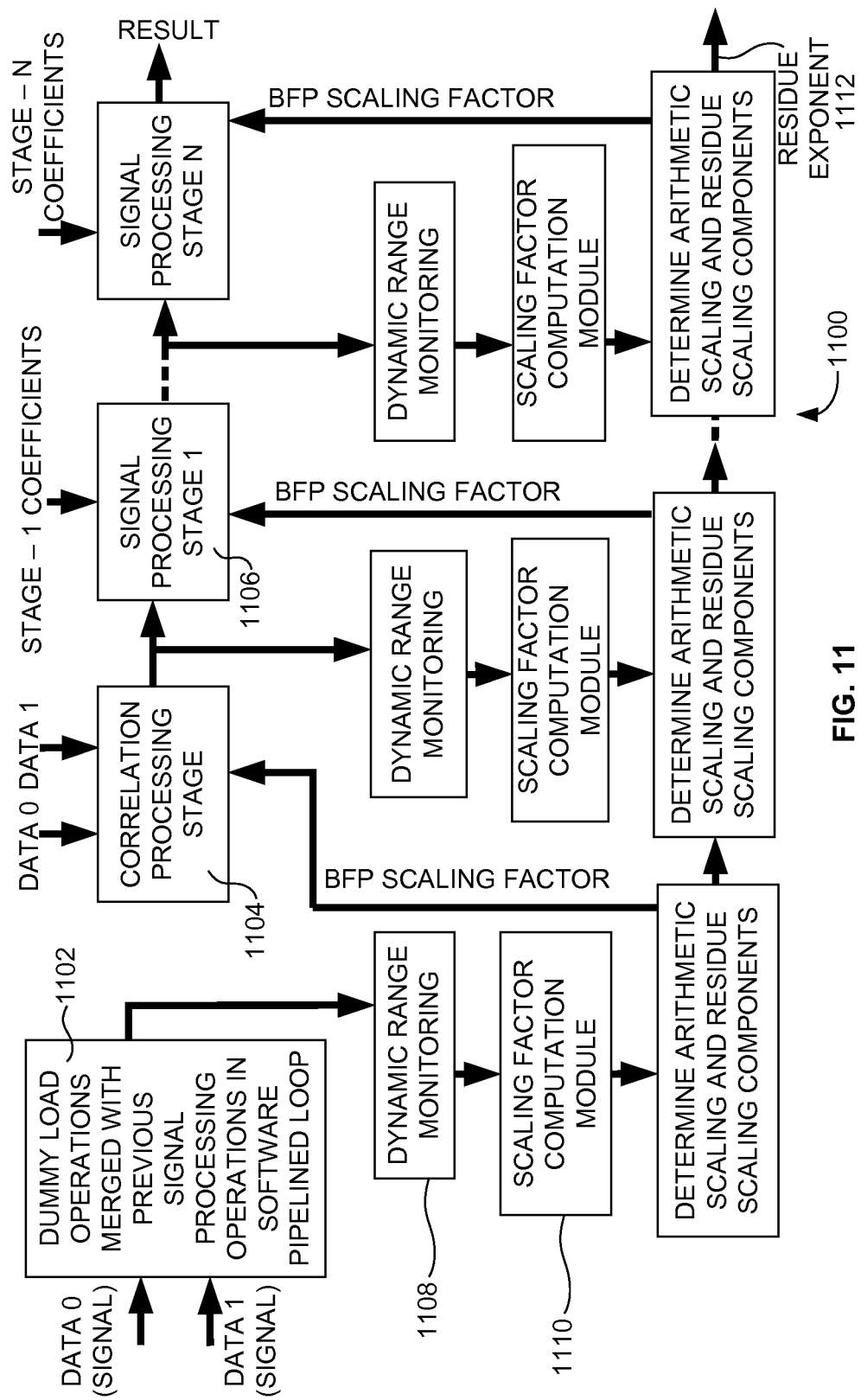
FIG. 11 illustrates method for implementing a block floating point by detecting a dynamic range while performing load operations in the CPU of FIG. 2 without additional overhead cycles according to an embodiment herein.

FIG. 11 illustrates method for implementing a block floating point by detecting a dynamic range while performing load operations in the CPU 200 of FIG. 2 without additional overhead cycles according to an embodiment herein. The dynamic range monitoring with load operations 1100 illustrates an example of correlation of 2 sets of data samples that includes a dummy load operations merged with previous signal processing operations in software pipelined loop 1102, a correlation processing stage 1104, a signal processing stage 1106, a dynamic range monitoring 1108, and a residue exponent 1112. In such cases, the dummy loads of the 2 data sets are performed and may be hidden as a part of the software pipelined loop 1102 execution of a previous signal processing step. In one embodiment, one or more load units of the load-store slot with dynamic range detection for unit1 206B, and the load-store slot with dynamic range detection for unit2 208B are configured for a memory store or load operation. An incoming read data of the input signals is snooped to detect the dynamic range. In one embodiment, a count of leading zeros and leading ones for each sub-word of the incoming read data of the input signal is detected for detecting the dynamic range.

Using such dummy loads 1102, the dynamic range of the data sets can be identified and used subsequently to compute the required scaling factor using a scaling factor computation module 1110. Once the required scaling factor (BFPScaling Factor) is ascertained, it is used for subsequent stages of correlation processing 1104. For all stages, the dynamic range monitoring can be done with load or store operations. It is determined whether a stage is a first stage. In one embodiment, the BFP scaling factor is set to zero when the stage is the first stage. A block floating point (BFP) scaling factor is obtained from a previous stage when the stage is not the first stage.

A new BFP scaling factor is computed for a second stage based on the dynamic range. An output of the first stage is shifted and written on a memory addressed by a DSP (e.g., the CPU 200 of FIG. 2) using the new BFP scaling factor along with a store operation. The new BFP scaling factor is computed based on a coefficient of the dynamic range. The dynamic range is detected by snooping an incoming read data of the input signals and latching in a memory read pipe of the CPU 200 of FIG. 2. The BFP scaling factor and the new BFP scaling factor are computed using a scaling factor computation module 1110. Arithmetic scaling and residue scaling components of the new BFP scaling factor may be determined. It may be determined whether the second stage is a last stage. If the second stage is the last stage, then arithmetic scaling and residue scaling components of the new BFP scaling factor may be determined for the last stage. A residue exponent may be computed by scaling the residue scaling components of the first stage until the last stage. Dummy load operations on two data sets of the input signal may be performed, and a dynamic range of the two data sets is detected. The dynamic range of the two data sets is detected based on the least value of the count of the leading zeros and leading ones and the least value of the count of trailing zeros over the block of data. A scaling factor may be computed based on the dynamic range of the two data sets of the input signal.

Figure 12:
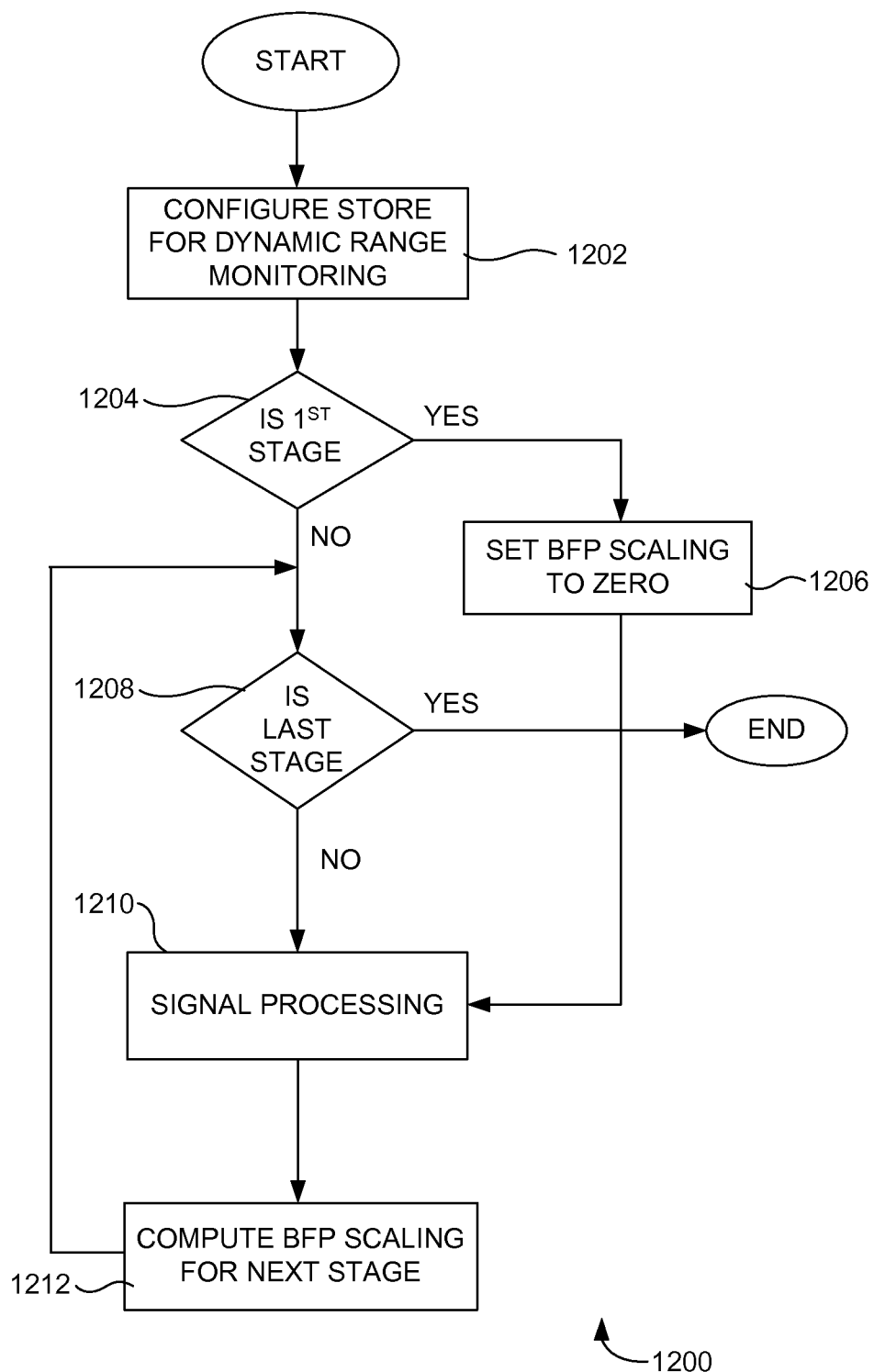
FIG. 12 illustrates a process flow of block floating point method according to an embodiment herein.

FIG. 12 illustrates a process flow of block floating point method 1200 according to an embodiment herein. In step 1202, the load and store units are configured for enabling dynamic range monitoring. In one embodiment, other units such as an arithmetic unit and a logical function unit of FIG. 2 may be configured for detecting the dynamic range of the input signal in the arithmetic unit and the logical function unit. The outgoing write data and incoming memory read data of an input signal are snooped to detect the dynamic range using the dynamic range monitor block 316. In step 1204, it is checked whether a signal processing stage is a first stage. If yes, the BFP scaling is set to zero in step 1206. A block floating point (BFP) scaling factor is obtained from a previous stage when the signal processing stage is not the first stage. A new BFP scaling factor for a second stage may be computed based on the dynamic range. Input data for the second stage is shifted using the new BFP scaling factor along with a first signal processing operation. An output of the first stage is shifted and written on a memory addressed by the CPU 200 of FIG. 2 using the new BFP scaling factor along with a second signal processing operation. In one embodiment, the first signal processing operation and the second signal processing operation is at least one of a load operation, a store operation, an arithmetic operation, and/or a logical function operation. The first signal processing operation is different from the second signal processing operation. For example, if the first signal processing operation is a load operation, then the second signal processing operation is a store operation. Similarly, the first signal processing operation can be an arithmetic operation, and the second signal processing operation can be a logical function operation. Similarly, the first signal processing operation and the second signal processing operation can be a combination of any of the above signal processing operations. Arithmetic scaling and residue scaling components of the new BFP scaling factor may be determined.

Else, it is checked whether it is the last stage in step 1208. In one embodiment, it is checked whether the second stage is a last stage. If it is last stage, the process is terminated. Else (If No), a specific signal processing operation for that stage is performed in step 1210. In one embodiment, arithmetic scaling and residue scaling components of the new BFP scaling factor for the second stage are determined. In step 1212, for the subsequent signal processing stages dynamic range monitoring is performed in a hidden or interleaved manner with store or load processes to find out a BFPScaling factor for each stage. Such scaling factors are subsequently used either completely or partially with the arithmetic operations of the next stage and the residue scaling factor can be used to scale up the final computed value in the chain of signal processing steps. In one embodiment, a residue exponent is computed by scaling the residue scaling components of the first stage till until the last stage. The residue scaling components of the first stage till until the last stage are scaled to get back required native precision of the input signal. Dummy load operations on two data sets of the input signal may be performed, and a dynamic range of the two data sets is detected. A scaling factor may be computed based on the dynamic range of the two data sets of the input signal. The dynamic range is detected based on the least value of the count of the leading zeros and leading ones and the least value of the count of trailing zeros over the block of data.

Figure 13:
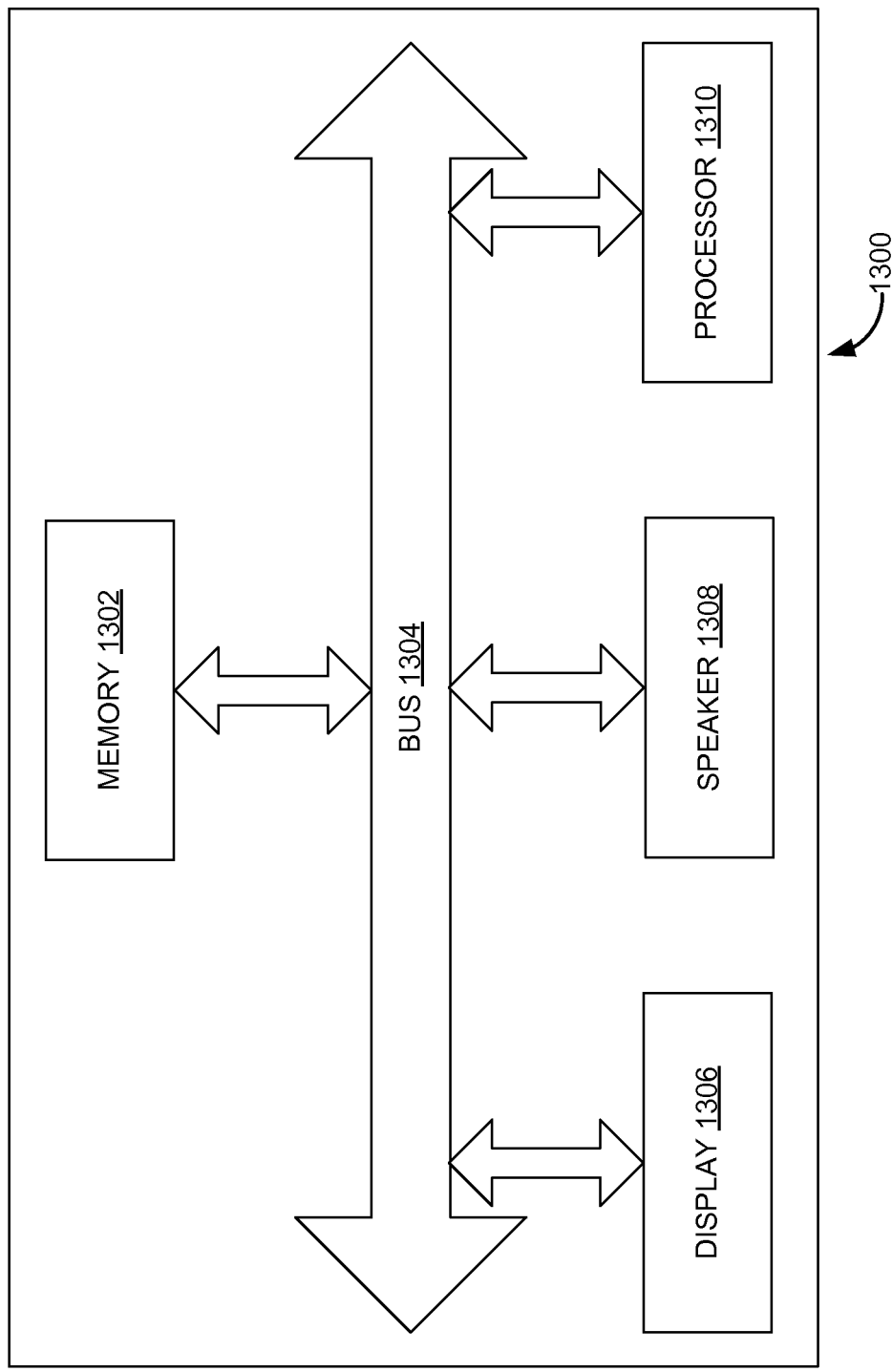
FIG. 13 illustrates an exploded view of a receiver having an a memory having a set of computer instructions, a bus, a display, a speaker, and a processor capable of processing the set of computer instructions to perform any one or more of the methodologies herein, according to an embodiment herein.

FIG. 13 illustrates an exploded view of a receiver 1300 having an a memory 1302 having a set of computer instructions, a bus 1304, a display 1306, a speaker 1308, and a processor 1310 capable of processing the set of computer instructions to perform any one or more of the methodologies herein, according to an embodiment herein. The processor 1310 may also enable digital content to be consumed in the form of video for output via one or more displays 1306 or audio for output via speaker and/or earphones 1308. The processor 1310 may also carry out the methods described herein and in accordance with the embodiments herein. Digital content may also be stored in the memory 1302 for future processing or consumption. The memory 1302 may also store program specific information and/or service information (PSI/SI), including information about digital content (e.g., the detected information bits) available in the future or stored from the past.

A user of the receiver 1300 may view this stored information on display 1306 and select an item for viewing, listening, or other uses via input, which may take the form of keypad, scroll, or other input device(s) or combinations thereof. When digital content is selected, the processor 1310 may pass information. The content and PSI/SI may be passed among functions within the receiver 1300 using bus 1304. In one embodiment, the CPU 200 is the same processor 1310.

The CPU 200 includes the dynamic range monitor block 316 that detects a dynamic range of the input signal while performing load and store operations in the CPU 200 of FIG. 2 without additional overhead cycles when implemented in a software defined radio (SDR) subsystem. In one embodiment, the dynamic range of the input signal may be detected while performing load and store operations in the CPU 200 when the CPU 200 is implemented in the receiver (e.g., the receiver 1300 of FIG. 13) or any other such receivers. The BFP scaling factors may be determined based on coefficient of the dynamic range.

The CPU 200 allows programmatically selecting the best dynamic range for different class of input signals and corresponding scaling factors (e.g., L1 norm, L2 norm, Chebyshev norm, and Euclidean norm). The CPU 200 allows detecting the dynamic range in other slots such as the arithmetic slot and the logical function slot of FIG. 2. The CPU 200 provides support in other computation slots (e.g., the arithmetic slot, and the logical function slot of FIG. 2) within the CPU 200 for efficient block floating point operations by using the dynamic range. This support is enabled by providing pre-scaling and post-scaling operations in conjunction with all Real and Complex Multiply and MAC operations.

Further, in a multi-processor system with multiple DSP (e.g., using more than one CPU 100) which have such type of Load-Store Units (e.g., the load store unit1 (LSU1) decode and operand fetch 206A, the load-store slot with dynamic range detection for unit1 206B, the load store unit2 (LSU2) decode and operand fetch 208A, and the load-store slot with dynamic range detection for unit2 208B for a memory store or load operation) it is possible to efficiently utilize the arithmetic data-path to maximize a Signal to Quantization Noise Ratio. (SQNR). Alternately in such a scenario for a given SQNR it is possible to use an arithmetic data-path with reduced precision. Thus for a given target SQNR it is possible to turn off bit-slices based on the required precision and save dynamic power dissipation. Further, the CPU 200 enables to communicate the scale-up or scale-down factors required in a signal processing chain for optimally using the arithmetic resources.

The CPU 200 requires minimal interference from software for block floating point (BFP) DSP operations. The method of detecting dynamic range as discussed above can be used for all classes of signal processing operations like correlation, and filtering operations such as a Finite Impulse Response (FIR) filtering, an Infinite Impulse Response (IIR) filtering, an interpolation, and a sample rate conversion filtering, etc., and not just limited to a fast fourier transform (FFT) alone. Further, for a fixed width arithmetic data-path this method of detecting the dynamic range enables to maximize the Signal to Quantization Noise Ratio (SQNR). For a fixed Signal to Quantization Noise Ratio this method allows using the minimum arithmetic data-path width and thus reduces the power dissipation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for computing a block floating point (BFP) scaling factor by detecting a dynamic range of an input signal in a central processing unit (CPU) without additional overhead cycles, said system comprising:
   a dynamic range monitoring unit that detects said dynamic range of said input signal by snooping (i) outgoing write data and (ii) incoming memory read data of said input signal, wherein said dynamic range monitoring unit comprises:
      a leading zero and leading one detector and counter unit that detects a count of leading zeros and leading ones for each sub-word of said outgoing write data and said incoming memory read data of said input signal;
      a registered maximum count unit that stores said count of leading zeros and leading ones for each sub-word of said outgoing write data and said incoming memory read data of said input signal;
      a least value finder unit that determines a least value of said count of said leading zeros and leading ones over a block of data; and
      a running maximum count unit that stores said least value of said count of said leading zeros and leading ones over said block of data,
      wherein said dynamic range is detected based on (i) said least value of said count of said leading zeros and leading ones over said block of data and (ii) a least value of a count of trailing zeros over said block of data; and
   a scaling factor computation module that computes said block floating point (BFP) scaling factor based on said dynamic range.

2. The system of claim 1, wherein said dynamic range monitoring unit further comprises
   a bus swapper unit that bus-swaps said each sub-word of said outgoing write data and said incoming memory read data of said input signal such that (i) a most significant bit (MSB) position of said each sub-word occupies a least significant bit (LSB) position, and (ii) a LSB position of said each sub-word occupies a MSB position;
   a trailing zeros detector and counter unit that detects said count of trailing zeros over said block of data for said each sub-word of said outgoing write data and said incoming memory read data of said input signal;
   a registered minimum count unit that stores said count of trailing zeros for said each sub-word of said outgoing write data and said incoming memory read data;
   a least value finder unit that determines said least value of said count of trailing zeros over said block of data; and
   a running minimum count unit that stores said least value of said count of trailing zeros over said block of data.

3. The system of claim 2, wherein said count of leading zeros and leading ones, said least value of said count of leading zeros and leading ones, said count of trailing zeros, and said least value of said count of trailing zeros are preset to a highest possible value before detecting said dynamic range at a start of said load and store operations.

4. The system of claim 1, further comprising a CPU control register (CCR) that turns on and turns off said dynamic range using a specified program.

5. The system of claim 4, wherein said dynamic range is updated in a control register file at an end of a signal processing operation when a value of control bit signals is cleared to zero.

6. The system of claim 5, wherein said signal processing operation is at least one of a load operation, a store operation, an arithmetic operation, and a logical function operation.

7. The system of claim 1, wherein said dynamic range is detected in at least one of a load store unit, an arithmetic unit, and a logical function unit.

8. A method for computing a block floating point (BFP) scaling factor by detecting a dynamic range of an input signal in a central processing unit (CPU) without additional overhead cycles, said method comprising:
   detecting, using a leading zero and leading one detector and counter unit, a count of leading zeros and leading ones for each sub-word of said outgoing write data and said incoming memory read data of said input signal;

storing, using a registered maximum count unit, said count of leading zeros and leading ones for each sub-word of said outgoing write data and said incoming memory read data of said input signal;

determining, using a least value finder unit, a least value of said count of said leading zeros and leading ones over a block of data;

storing, using a running maximum count unit, said least value of said count of said leading zeros and leading ones over said block of data; and detecting, by a dynamic range monitoring unit, said dynamic range based on (i) said least value of said count of said leading zeros and leading ones over said block of data and (ii) a least value of a count of trailing zeros over said block of data; and computing said block floating point (BFP) scaling factor based on said dynamic range.

9. The method of claim 8, further comprising
determining whether a signal processing stage is a first stage, wherein said BFP scaling factor is obtained from a previous stage when said signal processing stage is not said first stage; and computing a new BFP scaling factor for a second stage based on said dynamic range, wherein input data for said second stage is shifted using said new BFP scaling factor along with a first signal processing operation, wherein an output of said first stage is shifted and written on a memory addressed by said CPU using said new BFP scaling factor along with a second signal processing operation.

10. The method of claim 9, further comprising setting said new BFP scaling factor to zero when said signal processing stage is said first stage.

11. The method of claim 9, further comprising:
determining whether said second stage is a last signal processing stage; and
determining arithmetic scaling and residue scaling components of said new BFP scaling factor for said second stage.

12. The method of claim 11, further comprising computing a residue exponent by scaling said residue scaling components of said first stage until said last signal processing stage to obtain a required native precision of said input signal.

13. The method of claim 8, further comprising:
performing dummy load operations on two data sets of said input signal; and
detecting a dynamic range of said two data sets, wherein a scaling factor is computed based on said dynamic range of said two data sets of said input signal.

14. The method of claim 8, wherein said first signal processing operation and said second signal processing operation is at least one of a load operation, a store operation, an arithmetic operation, and a logical function operation.

15. The method of claim 8 further comprising
bus-swapping, using a bus swapper unit, each sub-word of said outgoing write data and said incoming memory read data of said input signal such that (i) a most significant bit (MSB) position of said each sub-word occupies a least significant bit (LSB) position, and (ii) a LSB position of said each sub-word occupies a MSB position;

detecting, using a trailing zeros detector and counter unit, said count of trailing zeros for said each sub-word of said outgoing write data and said incoming memory read data of said input signal;

storing, using a registered minimum count unit, said count of trailing zeros for said each sub-word of said outgoing write data and said incoming memory read data;

determining, using a least value finder unit, a least value of said count of trailing zeros over said block of data; and storing, using a running minimum count unit, said least value of said count of trailing zeros over said block of data.

* * * * *